United States Patent
Jiang

(10) Patent No.: US 7,873,358 B2
(45) Date of Patent: Jan. 18, 2011

(54) METHOD AND SYSTEM FOR PROVIDING INBOUND TRAFFIC REDIRECTION SOLUTION

(76) Inventor: John Yue Jun Jiang, 4114 Sugar maple Dr., Danville, CA (US) 94506

(*) Notice: Subject to any disclaimer, the term of this patent is extended or adjusted under 35 U.S.C. 154(b) by 749 days.

(21) Appl. No.: 11/819,164

(22) Filed: Jun. 25, 2007

(65) Prior Publication Data

US 2008/0108347 A1    May 8, 2008

Related U.S. Application Data

(63) Continuation-in-part of application No. 11/402,128, filed on Apr. 12, 2006, and a continuation-in-part of application No. 11/374,437, filed on Mar. 14, 2006, now Pat. No. 7,684,793, and a continuation-in-part of application No. 10/635,804, filed on Aug. 5, 2003, now Pat. No. 7,072,651.

(60) Provisional application No. 60/815,840, filed on Jun. 23, 2006, provisional application No. 60/818,283, filed on Jul. 5, 2006, provisional application No. 60/872,769, filed on Dec. 5, 2006.

(51) Int. Cl.
*H04W 4/00* (2009.01)
(52) U.S. Cl. .................. 455/435.1; 455/433; 455/432.1
(58) Field of Classification Search .................. 455/433, 455/432.1, 435.1
See application file for complete search history.

(56) References Cited

U.S. PATENT DOCUMENTS 5,353,328 A    10/1994    Jokimies 5,586,166 A    12/1996    Turban (Continued)

FOREIGN PATENT DOCUMENTS

CA    2281041 A1    2/2001

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner*—Barry W Taylor
(74) *Attorney, Agent, or Firm*—Arent Fox LLP

(57) ABSTRACT

The present invention provides a method for redirecting roaming traffic of a roamer associated with an HPMN and currently roaming in a first VPMN. The method includes detecting by a detection unit coupled to the first VPMN, a registration attempt of the roamer at a second VPMN, upon receipt of a first registration cancellation message of one or more registration cancellation messages, sent by the HPMN. Finally, the method includes causing the HPMN to send a registration response message to a VLR associated with the second VPMN, to thwart the registration attempt of the roamer at the second VPMN, by sending one or more registration messages to the HPMN from a redirection unit coupled to the first VPMN. The redirection unit further facilitates the roamer's mobile communication when the roamer's handset gets stuck in the second VPMN.

20 Claims, 12 Drawing Sheets

U.S. PATENT DOCUMENTS

| | | | |
|---|---|---|---|
| 5,742,910 A | 4/1998 | Gallant et al. |
| 5,818,824 A | 10/1998 | Lu et al. |
| 5,854,982 A | 12/1998 | Chambers et al. |
| 5,901,359 A | 5/1999 | Malmstrom |
| 5,903,832 A | 5/1999 | Seppanen et al. |
| 5,930,701 A | 7/1999 | Skog |
| 5,940,490 A | 8/1999 | Foster et al. |
| 5,943,620 A | 8/1999 | Boltz et al. |
| 5,987,318 A | 11/1999 | Alperovich et al. |
| 5,987,323 A | 11/1999 | Huotori |
| 5,987,325 A | 11/1999 | Tayloe |
| 6,014,561 A | 1/2000 | Mölne |
| 6,052,604 A | 4/2000 | Bishop et al. |
| 6,058,309 A | 5/2000 | Huang et al. |
| 6,075,855 A | 6/2000 | Christiansen et al. |
| 6,085,084 A | 7/2000 | Christmas |
| 6,138,005 A | 10/2000 | Park |
| 6,138,009 A | 10/2000 | Birgerson |
| 6,148,197 A | 11/2000 | Bridges et al. |
| 6,163,701 A | 12/2000 | Saleh et al. |
| 6,185,295 B1 | 2/2001 | Frederiksen et al. |
| 6,185,436 B1 | 2/2001 | Vu |
| 6,192,255 B1 | 2/2001 | Lewis et al. |
| 6,195,532 B1 | 2/2001 | Bamburak et al. |
| 6,208,864 B1 | 3/2001 | Agrawal et al. |
| 6,356,756 B1 | 3/2002 | Koster |
| 6,456,845 B1 | 9/2002 | Drum et al. |
| 6,456,859 B1 | 9/2002 | Desblancs et al. |
| 6,463,298 B1 | 10/2002 | Sorenson et al. |
| 6,466,786 B1 | 10/2002 | Wallenius |
| 6,505,050 B1 | 1/2003 | Brudos et al. |
| 6,574,481 B1 | 6/2003 | Rathnasabapathy et al. |
| 6,603,761 B1 | 8/2003 | Wang et al. |
| 6,603,968 B2 | 8/2003 | Anvekar et al. |
| 6,611,516 B1 | 8/2003 | Pirkola et al. |
| 6,628,934 B2 | 9/2003 | Rosenberg et al. |
| 6,671,523 B1 | 12/2003 | Niepel et al. |
| 6,684,073 B1 | 1/2004 | Joss et al. |
| 6,693,586 B1 | 2/2004 | Walters et al. |
| 6,738,622 B1 | 5/2004 | Stadelmann et al. |
| 6,738,636 B2 | 5/2004 | Lielbridis |
| 6,764,003 B1 | 7/2004 | Martshitsch et al. |
| 6,782,264 B2 | 8/2004 | Anderson |
| 6,795,444 B1 | 9/2004 | Vo et al. |
| 6,856,818 B1 | 2/2005 | Ford |
| 6,876,860 B1 | 4/2005 | Berg et al. |
| 6,920,487 B2 | 7/2005 | Sofer et al. |
| 6,925,299 B1 | 8/2005 | Sofer et al. |
| 6,961,559 B1 | 11/2005 | Chow et al. |
| 6,963,543 B2 | 11/2005 | Diep et al. |
| 6,968,383 B1 | 11/2005 | Heutschi et al. |
| 6,975,852 B1 | 12/2005 | Sofer et al. |
| 6,978,156 B1 | 12/2005 | Papadopoulos et al. |
| 7,020,479 B2 | 3/2006 | Martschitsch |
| 7,139,570 B2 | 11/2006 | Elkarat et al. |
| 7,184,764 B2 | 2/2007 | Raviv et al. |
| 7,231,431 B2 | 6/2007 | Sofer et al. |
| 7,684,793 B2 * | 3/2010 | Jiang ..................... 455/432.1 |
| 2002/0009199 A1 | 1/2002 | Ala-Laurila et al. |
| 2002/0012351 A1 | 1/2002 | Sofer et al. |
| 2002/0037708 A1 | 3/2002 | McCann et al. |
| 2002/0087631 A1 | 7/2002 | Sharma |
| 2002/0101858 A1 | 8/2002 | Stuart et al. |
| 2002/0101859 A1 | 8/2002 | Maclean |
| 2002/0160763 A1 | 10/2002 | Mittal et al. |
| 2002/0187780 A1 | 12/2002 | Souissi |
| 2002/0191575 A1 | 12/2002 | Kalavade et al. |
| 2002/0196775 A1 | 12/2002 | Tuohino et al. |
| 2003/0017843 A1 | 1/2003 | Noblins |
| 2003/0050047 A1 | 3/2003 | Ala-Luukko |
| 2003/0051041 A1 | 3/2003 | Kalavade et al. |
| 2003/0064723 A1 | 4/2003 | Thakker |
| 2003/0069922 A1 | 4/2003 | Arunachalam |
| 2003/0129991 A1 | 7/2003 | Allison et al. |
| 2003/0133421 A1 | 7/2003 | Sundar et al. |
| 2003/0139180 A1 | 7/2003 | McIntosh et al. |
| 2003/0208560 A1 | 11/2003 | Inoue |
| 2003/0224795 A1 | 12/2003 | Wilhoite et al. |
| 2003/0229791 A1 | 12/2003 | De Jong |
| 2004/0053610 A1 | 3/2004 | Kim |
| 2004/0087305 A1 | 5/2004 | Jiang |
| 2004/0120552 A1 | 6/2004 | Borngraber et al. |
| 2004/0131023 A1 | 7/2004 | Auterinen |
| 2004/0132449 A1 | 7/2004 | Kowarsch |
| 2004/0196858 A1 | 10/2004 | Tsai et al. |
| 2004/0229601 A1 | 11/2004 | Zabawskyj et al. |
| 2004/0236836 A1 | 11/2004 | Appleman |
| 2005/0021834 A1 | 1/2005 | Coulombe |
| 2005/0047378 A1 | 3/2005 | Wuschke et al. |
| 2005/0064883 A1 | 3/2005 | Heck et al. |
| 2005/0186939 A1 | 8/2005 | Barnea et al. |
| 2005/0186979 A1 | 8/2005 | McCann et al. |
| 2005/0215250 A1 | 9/2005 | Chava et al. |
| 2005/0232282 A1 | 10/2005 | Silver et al. |
| 2005/0250493 A1 | 11/2005 | Elkarat et al. |
| 2006/0003775 A1 | 1/2006 | Bull et al. |
| 2006/0009204 A1 | 1/2006 | Ophir |
| 2006/0025129 A1 | 2/2006 | Wolfman et al. |
| 2006/0052113 A1 | 3/2006 | Ophir et al. |
| 2006/0068778 A1 | 3/2006 | Della-Torre |
| 2006/0068786 A1 | 3/2006 | Florence |
| 2006/0079225 A1 | 4/2006 | Wolfman et al. |
| 2006/0079236 A1 | 4/2006 | Del Pino et al. |
| 2006/0148459 A1 | 7/2006 | Wolfman et al. |
| 2006/0205404 A1 | 9/2006 | Gonen et al. |
| 2006/0211420 A1 | 9/2006 | Ophir et al. |
| 2007/0021118 A1 | 1/2007 | Ophir et al. |
| 2007/0049269 A1 | 3/2007 | Ophir et al. |
| 2007/0054665 A1 | 3/2007 | Elkarat et al. |
| 2007/0072587 A1 | 3/2007 | Della-Torre et al. |
| 2007/0173252 A1 * | 7/2007 | Jiang ..................... 455/432.1 |
| 2007/0178885 A1 | 8/2007 | Lev et al. |

FOREIGN PATENT DOCUMENTS

| | | |
|---|---|---|
| EP | 0899 974 A2 | 3/1999 |
| GB | 2322998 | 9/1998 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/19667 | 7/2002 |
| WO | WO 03/019960 A1 | 3/2003 |
| WO | WO 03/043367 A | 5/2003 |
| WO | WO 03/065660 A | 8/2003 |
| WO | WO 2004/081802 | 9/2004 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002. pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).
Brunen, M. "Roaming im Zugangsnetz Mit OWLAN uberall zu Hause sein," Net-Zeitschrift Fuer Kommunikationsmangement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LA," NTZ (Nachrichtentechnische zeitschrift), 2002, pp. 24-26 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications, Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).
GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).
GSM 902 on MAP Specification Digital Cellular Telecommunications (Phase 2+); Mobile Application Part (MAP) Specification (3GPP TS 09.02 version 7.9.0 Release 1998).
Q 764 (1999), Signaling System No. 7—ISDN User Part signaling procedures.
Q 730 (1999), ISDN User Part supplementary services.
Q 711 (1996), Functional description of signaling connection control part.
Q 712 (1996), Definition and function of signaling connection control part messages.
Q713 (1996), Signaling connection control part formats and codes.
Q 714 (1996), Signal connection control part procedures.
Q 716 (1993), Signaling Connection Control Part (SCCP) performance.
GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).
Technical Specification 3$^{rd}$ Generation Partnership Project; Technical Specification Group Services and System Aspects; Service accessibility (Release 1999).
Signaling procedure and the Mobile Application Part (MAP) (Release 1999).
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).

GSM 23122 network selection 3GPP TS 23.122 V3.9.0 (Dec. 2002) Technical Specification; 3$^{rd}$ Generation Partnership Project; Technical Specification Group Core Network; NAS Functions related to Mobile Station (MS) in idle mode (release 1999).
GSM 22011 service accessibility; 3 GPP TS 22.011 V3.8.0 (Sep. 2002) Technical Specification; 3$^{rd}$ Generation Partnership Project; Technical Specification Group Services and System Aspects; Service accessibility (Release 1999).
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Performance objectives in the integrated services digital network application.
ITU-T Recommendation Q. 765 (1998), Signaling system No. 7—Application transport mechanism.
ITU-T Recommendation Q. 769.1 (1999), Signaling system No. 7—ISDN user part enhancements for the support of Number Portability.
3G TS 22.078 version 3.2.0 Release 1999 UMTS CAMEL.
Q.761 (Functional description of the ISDN User Part of CCITT Signaling System No. 7) (Dec. 1999).
Q762 (General Functions of CCITT Signaling System No. 7-ISDN User Part Message and parameters). 1999.
Q 763 (Formats and codes of CCITT Signaling System No. 7 ISDN User Part Message and parameters). 1999.
Q765 (Application Transport Mechanism, CCITT Signaling System No. 7 ISDN User Part ) (May 1998).
Q766 (Performance Objectives in the Integrated Services Digital Network Application, CCITT Signaling System No. 7 ISDN User Part) (Mar. 1993).
Q.767 (ITU-T—Application of the ISDN User Part of CCITT Signaling System No. 7 for International ISDN Interconnections) (1991).
Q.768 (ITU-T—Signalling Interface Between an International Switching Centre (ISC) and an OSDN Satellite Subnetwork) (Oct. 1995).
Q769 ITU-T—ISDN User Part Enhancements for the Support of No. Portability) (Dec. 1999).
Universal Mobile Telecommunications System (UMTS); Multimedia Messaging Service (MMS), Functional description; Stage 2 (3GPP TS 23.140 version 4.2.0 Release 4) (Mar. 22, 2001).
Q1214, ITU-T Intelligent Network Distributed Functional Plane For Intelligent Network CS-1. 1995.
Q1215, ITU-T Physical Plane for Intelligent Network CS-1. 1995.
Q1218 ITU-T Interface Recommendation for Intelligent Network CS-1. 1995.
GPP 29010; 3 GPP TS 29.010 V3.10.0; Technical Specification; 3$^{rd}$ Generation Partnership Project; Technical Specification Group Core Network; Information element mapping between Mobile Station—Base Station System (MS-BSS) and Base Station System—Mobile-services Switching Centre (BSS—3 MSC); (Dec. 2002).
ITU-T Q.771 Series Q: Switching and Signalling—Specifications of Signalling System No. 7—Transaction capabilities application part. Functional description of transaction capabilities (Jun. 1997)
ITU-T Q.772 Series Q: Switching and Signalling—Specifications of Signalling System No. 7—Transaction capabilities application part. Transaction capabilities information element definitions (Jun. 1997).
ITU-T Q.773 Series Q: Switching and Signalling—Specifications of Signalling System No. 7—Transaction capabilities application part. Transaction capabilities formats and encoding (Jun. 1997).
ITU-T Q.774 Series Q: Switching and Signalling—Specifications of Signalling System No. 7—Transaction capabilities application part. Transaction capabilities procedures: (Jun. 1997).
ITU-T Q.775 Series Q: Switching and Signalling—Specifications of Signalling System No. 7—Transaction capabilities application part. Guidelines for using transaction capabilities. (Jun. 1997).
GSM 11.11 Digital Cellular Telecommunications System (Phase 2+); Specification of the Subscriber Identity Module—Mobile Equipment (SIM-ME) Interface. Dec. 1995, version 5.0.0.
GSM 1114 Sim Toolkit. (Dec. 1996).
IR 7320 Steering of Roaming Implementation Guidelines 0.1. May 13, 2005.

GSM 03.48 version 8.3.0 Release 1999; ETSI TS 101 181 V8.3.0; Digital cellular telecommunications system (Phase 2+); Security Mechanisms for the SIM application toolkit; Stage 2; pp. 1-34; (Aug. 2000).

GSM 31048 Security and OTA (Oct. 2005).

GSM 23.119 3$^{rd}$ GenerationPartnership Project; Technical Specification Group Core Network; Gateway Location Register (GLR)—Stage 2 (3G TS 23.119 version 0.3.0). 1999.

GSM 408 Mobile Radio Interface Network Layer (May 1996).

GSM 23122 NAS Functions Related to Mobile Station (MS) in Idle Mode. 1999.

GSM 24.008 Digital Cellular Telecommunications Systems (Phase 2+) (GSM); Universal Mobile Telecommunications System (UMTS); Mobile Radio Interface Netwgrk Layer 3 Specification, Core Network Protocols—Stage 3 (3G TS 24.008 version 3.2.1 Release 1999) Jan. 2000.

GSM 253.04 3$^{rd}$ Generation Partnership Project; Technical Specification Group Radio Access Network; UE Procedures in Idle Mode (3G TS 25.304 version 3.0.0) 1999.

3GPP TS 29.002 version 4.9.0 Release 4; ETSI TS 129 002 V4.9. 0;Digital cellular telecommunications system (Phase 2+); Universal Mobile Telecommunications System (UMTS); Mobile Application Part (MAP) specification; pp. Jan. 1286; (Sep. 2002).

3G TS 23.278 version 6.0.0. Release 6, 3$^{rd}$ Generation Partnership Project; Technical Specification Group Core Network; Customized Applications for Mobile Network Enhanced Logic (CAMEL) Phase 4- Stage 2; IM CN Interworking. 2004.

GSM 360 GPRS Roaming Guidelines PRD IR.33. Version 3.2.0, Apr. 3, 2003.

GSM 09.60 version 7.4.1 Release 1998; ETSI EN 301 347 V7.4.1; Digital cellular telecommunications system (Phase 2+); General Packet Radio Service (GPRS); GPRS Tunnelling Protocol (GTP) across the GN and GP Interface; pp. 1-67; (Nov. 2000).

GSM 23060 3$^{rd}$ Generation Partnership Project; Technical Specification Group Services and System Aspects; General Packet Radio Service (GPRS); Service description; Stage 2 (Release 5). 2002.

GSM 29060 3$^{rd}$ Generation Partnership Project; Technical Specification Group Core Network; General Packet Radio Service (GPRS); GPRS Tunneling Protocol (GTP) across the GN and GP interface (release 1999).

GSM 23.012 3$^{rd}$ Generation Partnership Project; Technical Specification Group Core Network; Location Management Procedures (Release 4) 2001.

Q701, Specifications of Signalling System No. 7—Functional Description of the Message Transfer Part (MTP) of Signalling System No. 7. 1993.

Q702 ITU-T Specifications of Signalling System No. 7, Signalling Data Link. 1993.

Q703 ITU-T Specifications of Signalling System No. 7—Message Transfer Part. Signalling link. 1996.

Q704, Signalling network functions and messages. Specifications of Signalling System No. 7—Message Transfer Part. (Jul. 1996).

Q705, Signalling Network Structure. Specifications of Signalling System No. 7 (Mar. 1993).

* cited by examiner

METHOD AND SYSTEM FOR PROVIDING INBOUND TRAFFIC REDIRECTION SOLUTION

RELATED APPLICATIONS

This application claims the benefit of U.S. Provisional Patent Application Ser. No. 60/815,840 entitled "A network-based framework for retaining inbound roamers—Inbound-Traffic Redirection Based on HLR errors or VLR errors," filed on Jun. 23, 2006. This application also claims the benefit of U.S. Provisional Patent Application Ser. No. 60/818,283 entitled "A network-based framework for retaining inbound roamers—Inbound-Traffic Redirection Based on HLR errors or VLR errors," filed on Jul. 5, 2006. This application also claims the benefit of U.S. Provisional Patent Application Ser. No. 60/872,769 entitled "A network-based framework for retaining inbound roamers—Inbound-Traffic Redirection Based on HLR errors or VLR errors and integration with gateway location register and mechanisms for handling stuck handset," filed on Dec. 5, 2006. Further, this application is a continuation-in-part of U.S. patent application Ser. No. 11/402,128 entitled "Method and Apparatus for Redirection of Inbound Roamer Traffic," filed on Apr. 12, 2006, and a continuation-in-part of U.S. patent application Ser. No. 11/374,437 entitled "Method and Apparatus for Defense Against Network Traffic Redirection," filed on Mar. 14, 2006, now U.S. Pat. No. 7,684,793 claiming priority to Mar. 14, 2005, and a continuation-in-part of U.S. patent application Ser. No. 10/635,804 entitled "Method And System For Cellular Network Traffic Redirection," now U.S. Pat. No. 7,072,651, filed on Aug. 5, 2003, claiming priority to Aug. 5, 2002. All of these related patent applications are incorporated herein by this reference in their entireties.

FIELD OF THE INVENTION

The present invention generally relates to roamers in mobile networks. More specifically, the invention relates to controlling traffic of these roamers.

BACKGROUND OF THE INVENTION

Many companies and network operators deploy common carrier mobile communication systems in almost every country around the world. Many of those network operators offer international roaming to their subscribers traveling abroad, and to travelers visiting their territory who use their foreign mobile phones. Such an offering enables public mobile network (PMN) subscribers to use their mobile phones within the PMNs other than their own, such as the networks present in territories other than those covered by the network to which they normally subscribe.

Typically the network operators enter preferred bilateral roaming agreements ("partnerships") with each other that include more favorable roaming charges than those offered operators with whom they have established no such partnerships. Therefore, "preferred" visited networks are those that the home network prefers its outbound roamers to register with, when traveling outside their home coverage area, normally by virtue of such a partnership. Non-partner networks are "non-preferred" networks. Hence, the network operators can maximize their margins and the roamers can get more attractive roaming rates and better services if roamers roam on their home mobile operator's preferred (or partner) networks.

Subscribers may roam in one or more visited network(s) (i.e. Visited Public Mobile Networks (VPMN)) that may or may not be in the same country as their home network (i.e. Home Public Mobile Networks (HPMN)). In some cases a "non-preferred" VPMN may manage to get the subscribers from the HPMN, primarily due to "preferred" VPMN's failure in radio coverage, or manual selection by the subscriber of HPMN. This may also be due to traffic distribution by the HPMN Traffic Redirection (TR) (or Steering of Roaming (SoR)). Sometimes the HPMN operators use TR techniques to control the traffic distribution of the roamers among VPMNs in a country so that the "preferred" VPMN gets a higher percentage of the HPMN's roaming traffic as compared to the "non-preferred" VPMNs. However, these TR techniques may deprive the non-preferred VPMN operators of inbound roaming revenues. In some cases, these deprived VPMN operators may even have a partnership with the HPMN and be one of the "preferred" networks. In addition, TR technique, which typically functions by rejecting registration attempts, timing out or aborting the handset's attempt to register on a new VPMN, can generate network errors on the subscriber's mobile handset's radio interface. This compels the mobile handset to re-initiate a number of registration attempts, which unnecessarily overloads the network interface between the HPMN and the VPMN.

In some cases, competing and "non-preferred" VPMN operators may deploy a form of TR at their end to retain the inbound roamers (i.e. subscribers of HPMN) by stopping them from leaking out of their network. This decreases the revenues for other VPMN operators. The TR that these VPMN operators deploy is actually an inbound TR (ITR) solution to retain the inbound roaming subscribers.

The prior art also provides Anti-TR techniques designed to improve the chances of an inbound roamer registering successfully at a VPMN even when an HPMN is applying the TR against the VPMN. Other prior art techniques provide an anti-ITR system to counter a competitor VPMN's ITR attempt. One or more earlier filings provided integrated solutions to achieve the desired traffic redirection. In one case, the ITR and anti-TR solutions were integrated to handle the situation where an HPMN HLR issues a rejection error message to a VPMN in a location update response message. In another case, the ITR and anti-ITR solutions were integrated to help a VPMN operator retain the inbound roamer from leaking to other VPMNs. In one or more of the above solutions, a rejection error message that the HPMN HLR sends to the competitor VPMN, helps the VPMN operator to retain its inbound roamer. This rejection error message causes a failure of the inbound roamer's registration process with the competitor VPMN, and is usually termed as HPMN HLR abort.

However, the prior art TR, ITR anti-TR and anti-ITR techniques did not cover the scenario where a competitor VPMN VLR, instead of the HPMN HLR, aborts the registration attempt of the inbound roamer at the competitor VPMN. As the competitor VPMN VLR aborts the registration attempt, it is referred to as competitor VLR abort. Moreover, one or more of the above mentioned solutions did not consider the case when the inbound roamer's handset got stuck either during his registration attempt at the competitor VPMN or after his successful registration with the competitor VPMN.

In accordance with the foregoing, there is a need in the art for a system and method which allow a VPMN operator to perform traffic redirection on the inbound roamers, in order to cause the VLR of the competitor VPMN to abort the inbound roamer's registration attempt at the competitor VPMN. This helps the VPMN operators to retain its inbound roamers. There is also a requirement to alleviate the problem of stuck handset, as described above.

SUMMARY

The present invention is directed to provide a method for redirecting roaming traffic of a roamer, associated with an HPMN, and currently roaming in a first VPMN, where the roamer may attempt to register with another network that is located in the same country or different country as first VPMN. The method includes detecting by a detection unit, a registration attempt of the roamer at a second VPMN, upon receipt of a first registration cancellation message of one or more registration cancellation messages at the first VPMN, sent by the HPMN. The method further includes causing the HPMN to send a registration response message to a VLR associated with the second VPMN, to thwart the registration attempt of the roamer at the second VPMN, by sending one or more registration messages to the HPMN from a redirection unit. The redirection unit and the detection unit are coupled to the first VPMN. The redirection unit further facilitates the roamer's mobile communication when the roamer's handset gets stuck in the second VPMN.

Another aspect of the invention presents a system for redirecting roaming traffic of a roamer, associated with an HPMN, and is currently roaming in a first VPMN, where the roamer may attempt to register with another network that is located in the same country or different country as first VPMN. The system includes a detection unit coupled to the first VPMN that detects a registration attempt of the roamer at a second VPMN, upon receipt of a first registration cancellation message of one or more registration cancellation messages at the first VPMN from the HPMN. The system further includes a redirection unit coupled to the first VPMN for sending one or more registration messages to the HPMN to cause the HPMN to send a registration response message to a VLR associated with the second VPMN that thwarts the registration attempt of the roamer at the second VPMN. Thereafter, the redirection unit facilitates the roamer's mobile communication when the roamer's handset gets stuck in the second VPMN.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the invention. The appearance of the phrase "in an embodiment", in various places in the specification, does not necessarily refer to the same embodiment.

The present invention provides a system, a method, and a computer program product, to control traffic of a roamer, associated with a home network, between a first visited network, a competitor's visited network and the home network. The system provides an Inbound Traffic Redirection (ITR) architecture that allows that first visited network operator to retain its inbound roamers. The system further provides a VLR error based approach, for use when a Visitor Location Register (VLR) associated with the competitor visited network itself aborts the registration attempt of the roamer at the competitor visited network. This allows the operator of that first visited network to retain its inbound roamers.

The system allows a visited network operator to authenticate the inbound roamer with his home network in case the home network has such authentication requirement. The system also allows the visited network operator to blacklist and whitelist either a Home Location Register (HLR) associated with the home network, or Visited Mobile Switching Center/Visited Location Register (VMSC/VLR) associated with the competitor visited network, or a combination of both. This blacklisting and whitelisting is performed based on various criteria, which are described later in context of the present invention. The system also handles various cases when the inbound roamer's handset gets stuck due to the ITR attempt by the visited network. This may either happen during the inbound roamer's registration attempt at the competitor visited network, or after his successful registration with the competitor visited network. The system also provides a Gateway Location Register (GLR) based solution that allows the visited network to create a synthetic (referred to here as "fake") traffic distribution image at the HPMN HLR that eventually results in maximizing roaming revenues of the visited network operator, since the HLR diverts the roaming traffic to the visited network. Various embodiments of this GLR based faking solution are described later in context of the present invention.

Figure 1:
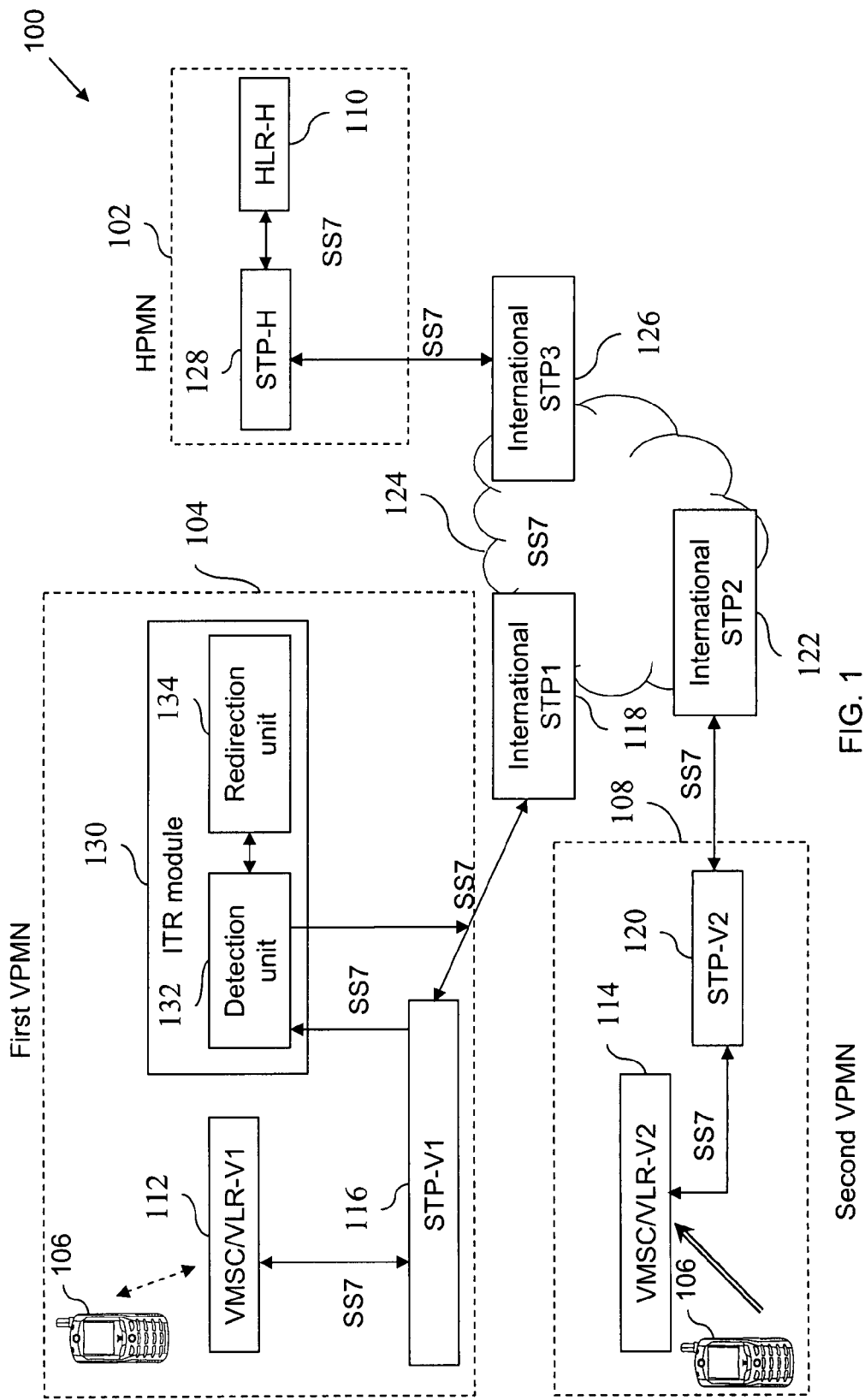
FIG. 1 represents a system for implementing Inbound Traffic Redirection System (ITRS) solution, in accordance with an embodiment of the present invention.

Earlier approaches ("previous ITR"), such as that taught by the inventor of U.S. patent application Ser. No. 11/402,128, filed on Apr. 12, 2006, provide ways of allowing a network operator to deploy a network-side MAP signaling-based solution to retain inbound roamers on its network. In other words, those approaches provide techniques for performing ITR. FIG. 1 represents a system 100 for providing an Inbound Traffic Redirection System (ITRS) solution. This ITRS solution allows traffic redirection of the roamers, associated with a Home Public Mobile Network (HPMN) 102, in a first Visited Public Mobile Network (VPMN) 104. A roamer 106, who is originally a subscriber of HPMN 102, registers with first VPMN 104 (represented in dashed line in FIG. 1). In some cases, roamer 106 may attempt to (or is forced to) register with a second VPMN 108 (i.e. competitor visited network). HPMN 102 includes a Home Location Register (HLR) 110, which is hereinafter referred to as HLR-H 110. It will be apparent to a person skilled in the art that HLR-H 110 stores profile data corresponding to all roamers of HPMN 102.

Techniques by which an HPMN can steer outbound roamers to preferred VPMNs are known, and referred to here as "previous TR." In one embodiment of the present invention, HPMN 102 may include a TR module (not shown in FIG. 1) that is used to redirect the roaming traffic of its outbound roamers to a "preferred" visited network. For example, if second VPMN 108 is a preferred network of HPMN 102, HPMN 102 will attempt to redirect the traffic of roamer 106 to second VPMN 108, using the TR module deployed at its network.

Techniques by which a VPMN operator can counter attempts by an HPMN at outbound traffic redirection are also known. For instance, examples of such "previous anti-TR" are taught by the inventor of U.S. patent application No. 60/662,030 filed on Mar. 14, 2005, System 100 may optionally include in first VPMN 104, an anti-TR module (not shown in FIG. 1) for countering the HPMN's TR attempt. Various embodiments where the VPMN operator counters the HPMN TR attempts, in addition to the ITRS solution are described later in conjunction with FIG. 5.

System 100 includes in first VPMN 104, a first VPMN VLR 112 that is integrated with a VMSC in first VPMN 104. Similarly, second VPMN 108 includes a second VPMN VLR 114 that is integrated with a VMSC in second VPMN 108. As first VPMN VLR 112 and its integrated VMSC reside in first VPMN 104, they are interchangeably referred to as VMSC/VLR-V1 112. Similarly, second VPMN VLR 114 and its integrated VMSC are interchangeably referred to as VMSC/VLR-V2 114. Notwithstanding, both the VPMN VLRs and the VMSCs may have different logical addresses. Roamer 106's signaling in first VPMN 104 is routed via a switch/roaming STP-V1 116 and an international STP1 118 to HPMN 102. Similarly, roamer 106's signaling in second VPMN 108 is routed via a switch/roaming STP-V2 120 and an international STP2 122 to HPMN 102. HPMN 102 communicates with first VPMN 104 and second VPMN 108 using Signaling System #7 (SS7) signaling architecture 124 involving an international STP3 126 connected to a switching/roaming STP-H 128 in HPMN 102. The signals exchanged between different networks are Transaction Capabilities Application Part (TCAP) including Mobile Application Part (MAP), Camel Application Part (CAP) and the like based signals. In another embodiment of the present invention, the signals exchanged are Signaling Connection Control Part (SCCP) based routing signals.

Roamer 106 may attempt to register with second VPMN 108, even though he is already registered with first VPMN 104, due to one or more of the following reasons. For example, roamer 106 may attempt to change the VPMN network in case there is weak signal strength or a loss of coverage in first VPMN 104, or due to new available technology (e.g., GPRS or 3G) in second VPMN 108. In another case, HPMN 102 may redirect the traffic of roamer 106 to some other network operator in second VPMN 108, even though an operator in HPMN 102 may have a roaming relationship with first VPMN 104. In yet another embodiment of the invention, this network reselection may also be due to preferred PLMN timer on roamer 106's handset, indicating preference of second VPMN 108 over first VPMN 104. This steering of traffic deprives the operator in first VPMN 104 of the revenue from roamer 106.

System 100 further includes in first VPMN 104, an ITR module 130 that monitors the traffic between HPMN 102 and first VPMN 104, and issues one or more signaling messages in order to attempt to redirect roamer 106's traffic to first VPMN 104. In one embodiment of the invention, the operator in first VPMN 104 deploys ITR module 130 to counter the TR attempt by the operator in HPMN 102, and the ITR attempt by the operator in second VPMN 108. ITR module 130 includes a detection unit 132 for monitoring the MAP signaling messages exchanged between STP-V1 116, and international STP1 118. This monitoring is referred to as passive monitoring. ITR module 130 further includes a redirection unit 134 for sending one or more MAP signaling messages to redirect roamer's traffic. HPMN 102's deployed detection unit 132 and redirection unit 134 are collectively referred to as ITR module 130 for providing the ITRS solution, in accordance with various embodiments of the present invention. It will be apparent to a person skilled in the art, that different functions are associated with detection unit 132 and redirection unit 134 only for exemplary purposes. Any functional property of any of the two will be associated with ITR module 130. In other words, any function that is to be performed by either detection unit 132 or redirection unit 134 is alternatively capable of being performed by ITR module 130 alone.

In another embodiment of the present invention, ITR module 130 actively intercepts the signaling from STP-V1 116 or from international STP1 118 in an in-signaling path mode. In this case, the operator in first VPMN 104 may configure STP-V1 116 to assist in exchange of one or more registration cancellation message (i.e. MAP CancelLocation), and one or more registration messages (i.e. MAP LUP) between HPMN 102 and first VPMN 104. In one embodiment of the present invention, a first registration cancellation message is a CancelLocation message sent from HLR-H 110 to cancel the registration of roamer 106 with first VPMN 104. In another embodiment of the present invention, one or more registration messages are LUP messages that are sent on behalf of roamer 106. In one embodiment of the invention, all signals exchanged through STP-V1 116 are SCCP/TCAP based signals. Such "active" monitoring is hereinafter referred interchangeably as in-signaling mode. In the in-signaling mode, ITR module 130 is deployed on roaming SS7 path by configuring STP-V1 116 to route international roaming SCCP traffic through ITR module 130. In one embodiment of the present invention, the operator in first VPMN 104 configures STP-V1 116 to provide a primary routing (i.e. via ITR module 130) and a secondary routing (i.e. via VLR-V1 112) of incoming and outgoing signaling messages. The secondary routing provides a redundant path for routing of traffic in case of failure of primary routing. Hence, the monitoring or probing of the TR attempt is performed in two modes, passive monitoring or active monitoring of the signals.

It will be apparent to a person skilled in the art that in order to avoid looping of routing of messages, involved in the TR process, the ITR can be either performed using a Translation Types (or tables) (TT) or using an Message Transfer Part (MTP) routing. This involves international STP Signal Point Code (SPC) and Switching/Roaming SPC depending on the network setup in VPMN(s). In case the TT is used, the operator in first VPMN 104 configures STP-V1 116 and ITR module 130 for both incoming and outgoing international SCCP signaling messages. Considering the second technique of using MTP routing, the operator in first VPMN 104 configures STP-V1 116 to send an incoming message, with a Numbering Plan (NP) as E.214 and CdPA Destination Point Code (DPC) as ITR module 130. Various other embodiments involved in the TT and the MTP routing techniques have already been described in the previous ITR filing.

Figure 2:
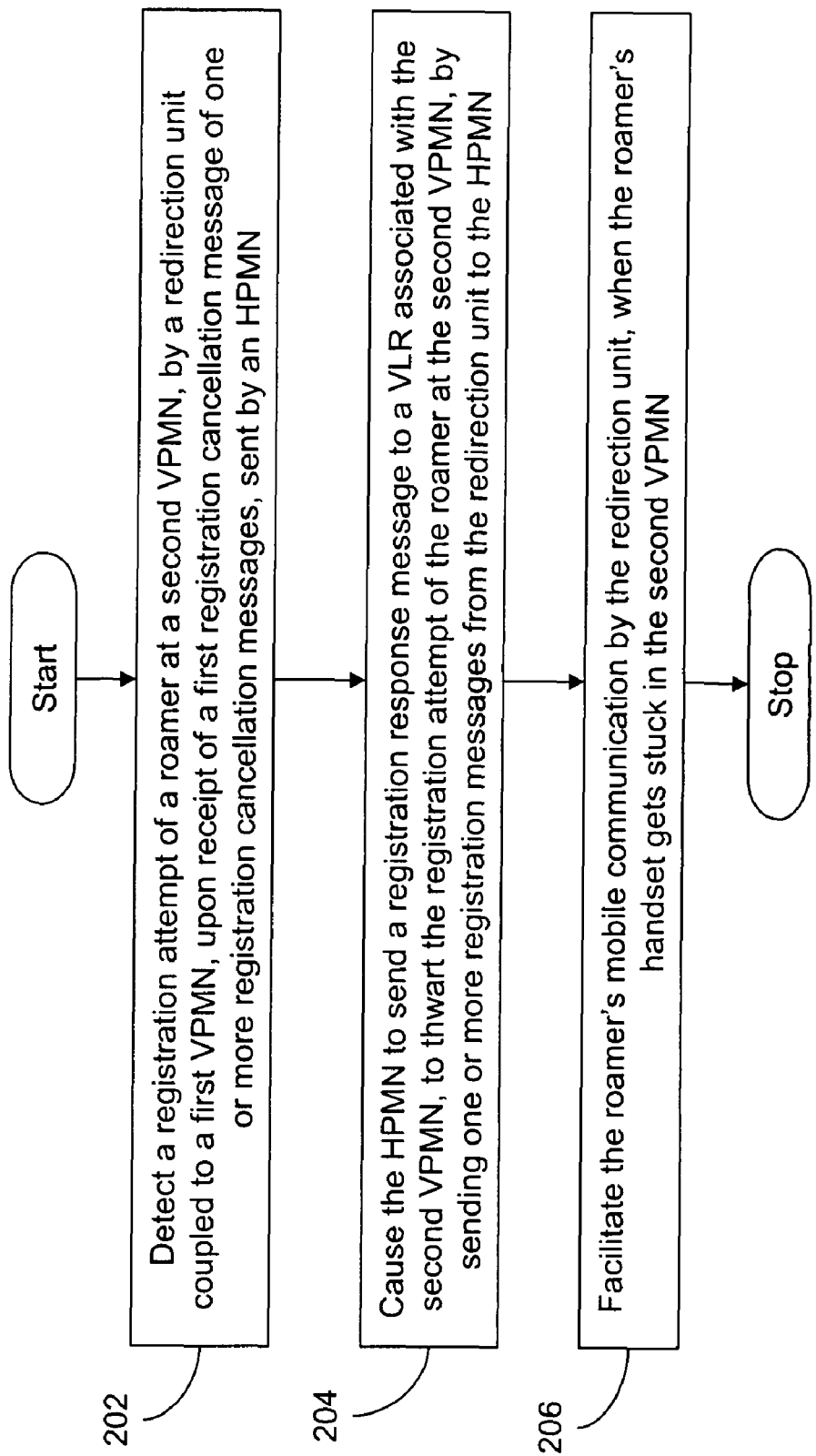
FIG. 2 is a flowchart for implementing ITRS solution in a Visitor Location Register (VLR) error based approach, in accordance with an embodiment of the present invention.

The present invention provides various embodiments where the competitor VPMN VLR (i.e. VLR-V2 114), instead of HLR-H 110, aborts the registration attempt of the inbound roamer at the competitor VPMN. As the competitor VPMN VLR aborts the registration attempt, it is referred to as competitor VLR abort. FIG. 2 is a flowchart for controlling traffic of the roamer of HPMN in the VLR error based approach, in accordance with an embodiment of the invention. At step 202, a redirection unit coupled to a first VPMN detects a registration attempt of a roamer at a second VPMN, upon receipt of a first registration cancellation message of one or more registration cancellation messages, which the HPMN sends. In an embodiment of the present invention, when roamer 106 makes a registration attempt at second VPMN 108, VLR-V1 112 receives a MAP CancelLocation message from HPMN 102. ITR module 130 detects this registration attempt by monitoring (i.e. actively or passively) the MAP CancelLocation message. Thereafter, at step 204, the redirection unit sends one or more registration messages to the HPMN that causes the HPMN to send a registration response message to a VLR associated with the second VPMN, to thwart the registration attempt of the roamer at the second VPMN. In one embodiment of the present invention, ITR module 130 sends a MAP Location Update message (i.e. LUP) on behalf of first VPMN 104 to HLR-H 110 that causes HLR-H 110 to send a registration response message, such as LUP-ACK or MAP CancelLocation message or LUP reject error to second VPMN 108. Since this LUP message is sent on behalf of roamer 106 giving an impression that roamer 106 is in first VPMN 104, it is hereinafter referred to as "fake" LUP message. Signaling response messages such as CancelLocation message or LUP reject error, causes HPMN 102 to abort the registration attempt of roamer 106 at second VPMN 108.

In another embodiment of the present invention, HLR-H 110 may require first VPMN 104 to authenticate the inbound roamers of HPMN 102, prior to initiating the registration process between HPMN 102 and first VPMN 104. In such a case, the operator in first VPMN 104 may perform an authentication (using a Send Authentication Information (SAI) message) of the inbound roamer, prior to sending the LUP message to HLR-H 110. In an embodiment of the present invention, roamer 106's handset gets stuck in second VPMN 108, either during its registration attempt with second VPMN 108, or after its successful registration with second VPMN 108. This may happen due to the implementation of the ITRS solution at first VPMN 104. In such cases, after the authentication and synthetic or "fake" registration is done, the redirection unit at step 206 facilitates the roamer's mobile communication. In other words, redirection unit 134 enables roamer 106 to make and receive calls despite being stuck earlier. FIGS. 7A, 7B, and 7C, and FIGS. 8A, 8B, 8C describe various embodiments that cause the roamer's handset to get stuck in the second VPMN, and the mechanism used to handle such cases.

In one embodiment of the present invention, ITR module 130 in first VPMN 104 exploits the racing condition of its fake LUP messages and the competitor network's (i.e. second VPMN 108) ongoing location update with HLR-H 110. Therefore, ITR module 130 is able to create HPMN 102 TR on roamer 106, according to its preferences, irrespective of whether HPMN 102 has the TR solution deployed at its network. The ITRS solution also has a dependency of TR, e.g. on mobile handsets and some VLR/VMSC/Base Station Subsystem (BSS) versions. As per Global System for Mobile communication (GSM) standard, the CancelLocation message to a previous VPMN (triggered by a new location update) is an independent process from an ongoing location update process. In addition, the GSM standard does not make sending of CancelLocation message time dependent. In other words, HPMN 102 may opt to send the CancelLocation message to the previous VPMN (i.e. network with which roamer 106 was earlier registered) before or after the completion of the ongoing location update process. In an embodiment of the present invention, HPMN HLR (i.e. HLR-H 110) sends the CancelLocation message immediately, upon a receipt of a new LUP message. In another embodiment of the present invention, some HPMN HLR (e.g. some Nokia™ HLR versions) issues the CancelLocation message to the ITR deploying VPMN (i.e. first VPMN 104) only after the completion of location update process of roamer 106 with the competitor VPMN (i.e. second VPMN 108). Therefore, the ITRS solution also depends upon the HPMN HLR implementation.

In an embodiment of the present invention, upon receiving a new LUP message in the middle of an ongoing location update transaction, some HPMN HLRs issue CancelLocation message to the ongoing location update transaction, while some HPMN HLR aborts the ongoing location update transaction. As a result, the ITRS solution indirectly also depends on the competitor VPMN VLR (i.e. VLR-V2 114) implementation, i.e. when they are not following the GSM standard. In an embodiment of the present invention, the competitor VPMN VLR aborts the ongoing LUP transaction when it receives the CancelLocation message on roamer from the HPMN HLR. However, some VLR versions do not follow the GSM standard, and hence do not abort the ongoing LUP transaction. In addition, upon receiving the HPMN HLR abort for the ongoing LUP transaction, most VLR/VMSC/BSS will generate a network failure error at an air interface (which is received at roamer 106's handset) according to the GSM standard. However, some VLR/VMSC/BSS combinations again do not follow the GSM standard and hence do not generate a network failure error at the air interface. Therefore, ITR retention success depends upon both the HPMN HLR, and the competitor VPMN VLR, in addition to the normal dependencies of the TR.

Like TR, the ITRS solution is based on a statistical distribution framework. Usually, retention success can be in the range of 10% to 20%. The retention success is defined as the percentage of departing roamers to competitor network retained back.

$$\text{Retention success} = \frac{\begin{bmatrix} \text{Retained roamers departing to} \\ \text{competitor network} \end{bmatrix}}{[\text{Departing roamers to the competitor network}]} \%$$

Despite all these dependencies, the ITRS still can provide a significant revenue increase on inbound roaming revenue due to its statistical success.

Figure 3:
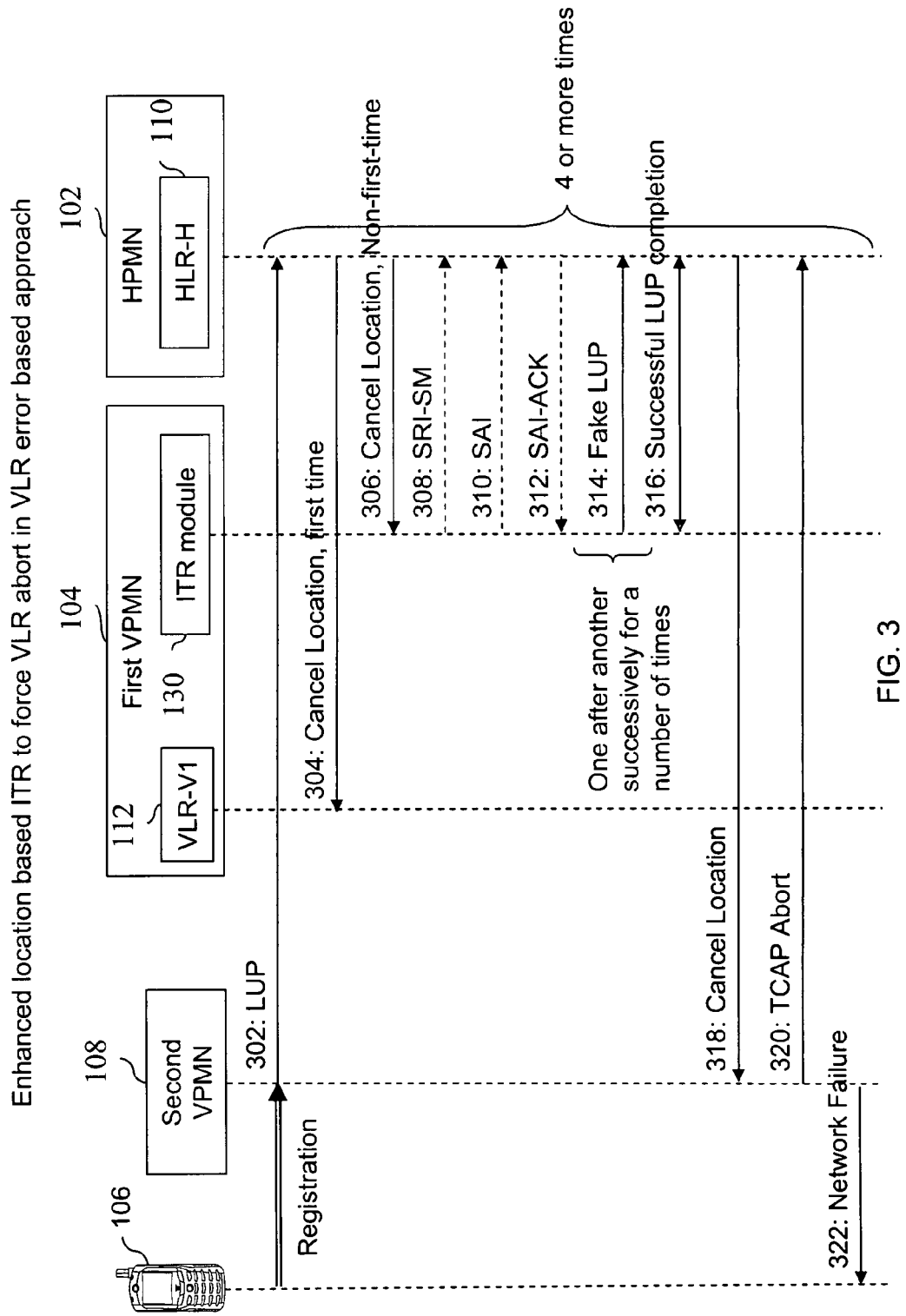
FIG. 3 represents a flow diagram for providing enhanced location based ITR to cause a competitor VLR abort in the VLR error based approach, in accordance with an embodiment of the present invention.

As described earlier, the present ITRS solution provides a VLR error based approach that causes the competitive VPMN VLR abort due to the ITR attempt from first VPMN 104, when roamer 106 attempts to register with the competitor VPMN (i.e. second VPMN 108). FIG. 3 represents a flow diagram for providing enhanced location based ITR to cause the competitor VLR abort in the VLR error based approach, in accordance with an embodiment of the present invention. In case roamer 106 leaves the VPMN deploying ITR module 130, ITR module 130 continues to send the fake LUP messages to HLR-H 110. To avoid such a situation, the enhanced location based ITR is performed.

Roamer 106 may attempt to (or is forced to attempt to) register with second VPMN 108 due to one or more reasons mentioned above. Hence, at step 302, VLR-V2 114 sends an LUP message to HLR-H 110. Detection unit 132 can deduce that roamer 106 is attempting to register with second VPMN 108 when it detects no new registration message sent from first VPMN 104; and it still detects receipt of one or more registration cancellation messages (i.e. CancelLocation message) at first VPMN 104. A first registration cancellation message of one or more registration cancellation messages is sent directly to VLR-V1 112, while the subsequent registration cancellation messages are tapped at ITR module 130. Therefore, at step 304, HLR-H 110 sends a MAP CancelLocation message to VLR-V1 112, in order to abort roamer 106's registration with first VPMN 104. Thereafter, at step 306, HLR-H 110 sends another MAP CancelLocation message that is tapped by ITR module 130. In order to perform ITR, in accordance with an embodiment of the present invention, ITR module 130 sends one or more registration messages (i.e. fake LUP message) to HLR-H 110, upon detecting a receipt of the CancelLocation message at detection unit 132. This causes HLR-H 110 to send an abort message, such as CancelLocation to VLR-V2 114, which returns an acknowledgement, such as TCAP abort to HLR-H 110. This aborts roamer 106's registration with second VPMN 108 generating a network failure on roamer 106's handset. This call flow later explains in detail the process of causing HLR-H 110 to send the abort message and receive subsequent response from second VPMN 108's VLR.

In another embodiment of the present invention, while performing the enhanced location based ITR attempt, ITR module 130 sends a search request message upon receipt of the CancelLocation message from HLR-H 110. Various embodiments of sending the search request message to a last known VMSC of roamer 106 to collect location area information of roamer 106 are similar to the previous ITR filing. However, if there are errors to the search request message, then the current network and the country of roamer 106 cannot be identified. To avoid this problem, another embodiment of performing location based ITR attempt is now described. Referring to FIG. 3, after the first CancelLocation message is received at VLR-V1 112, ITR module 130 can send a routing request immediately, prior to sending the fake LUP message to HLR-H 110. In one embodiment of the invention, the routing request is a MAP Send Routing Information for Short Message (SRI-SM) message. In another embodiment of the invention, the routing request is an SRI message. In yet another embodiment of the invention, the routing request is an Any Time Interrogation (ATI) message. The SRI-SM message can be sent on a Mobile Station International Subscriber Directory Number (MSISDN) of roamer 106. Hence, at step 308, ITR module 130 can send the SRI-SM message to HLR-H 110, in order to retrieve a VMSC address of roamer 106.

In an embodiment of the present invention, in case HLR-H 110 requires first VPMN 104 to authenticate roamer 106 with his HPMN 102, first VPMN 104 can initiate an authentication procedure, prior to sending the fake LUP message to HLR-H. In another embodiment of the present invention, first VPMN 104 is required to initiate the authentication procedure in case roamer 106 was registering with first VPMN 104 for the first time. At step 310, ITR module 130 sends one or more authentication messages, such as Send Authentication Information (SAI) request to HLR-H 110, prior to sending one or more registration messages (i.e. fake LUP messages) to HLR-H 110. In yet another embodiment of the present invention, if the operator in HPMN 102 is determined to be present in a whitelist of the operator in first VPMN 104, ITR module 130 sends the SAI request message to HLR-H, in order to authenticate roamer 106 with his HPMN 102. Thereafter, at step 312, HLR-H 110 returns an SAI-ACK message that indicates successful authentication of roamer 106. In an embodiment of the present invention, the SAI-ACK message consists of one or authenticating parameters, such as triplets and quintuplets, used for authenticating roamer 106 with his HPMN 102. Steps 308 to 312 are shown in dashed line, as the operator in first VPMN 104 may optionally perform these steps, depending upon its implementation requirement and feasibility.

For each registration cancellation message detected, ITR module 130 sends one or more fake LUP messages within a first pre-defined interval of time (T0) until one registration message is recorded as a successful transaction. Hence, at step 314, ITR module 130 attempts to redirect the traffic to first VPMN 104 by sending one or more fake LUP to HLR-H 110. T0 is the time interval required for completion of location update process at HLR-H 110. However, all the fake LUP messages from ITR module 130 need to be sent within a second pre-defined time interval (T1), and/or until a re-registration threshold is reached. The T1 time interval is a re-registration timer that indicates the time left to perform an ITR attempt for a departing roamer. Various other interpretations of T0 and T1 time interval are similar to the previous ITR filing.

As explained earlier, ITR module 130 attempt the ITR by sending various MAP messages, such as, but not limited to, SRI-SM message, SAI message, and fake LUP message. In one embodiment of the present invention ITR module 130 may send these messages using one or more GT(s) for each CancelLocation message received at VMSC/VLR-V1 112. The GT used for sending these messages may be a new GT allocated to ITR module 130 by the operator in first VPMN 104. However, in this case, ITR module 130 needs to inform all its roaming partners regarding the new GT being used for performing any kind of TR attempt, as per IR 21 roaming guideline. This ensures that the roaming partners of first VPMN 104 configure their respective STPs for appropriately routing the signaling messages on the new GT to ITR module 130.

However, some VPMN operators may not like to disclose to their competitor VPMN or HPMN operator that they are performing any kind of TR against them. Also, some VPMN operators may not have a spare GT to allocate to ITR module 130. In either of these cases, ITR module 130 may use a GT of VLR-V2 114 after modifying it. The modified VLR-V2 GT may be generated by adding one or more trailing digits to the VLR-V2 GT. In other words, ITR module 130 post-fixes the existing VLR-V2 GT (usually less than 15 digits) to create a new post-fixed GT of 15 digits or less. Also, the operator in first VPMN 104 configures STP-V1 116 to route all incoming signaling messages with CdPA as the new post-fixed GT to ITR module 130. Since, the STPs usually route the GTs based on their prefixes instead of postfixes, it helps the operator in first VPMN 104 to avoid informing other competitor networks (and even HPMN) of this post-fixed GT and thus remain unknown while attempting any kind of TR. This at least makes it difficult for HPMN and other VPMN operators to discover its ITR module 130.

In one embodiment of the present invention, ITR module 130 sends the fake LUP message upon a receipt of an SRI-SM ACK message. In another embodiment of the present invention, ITR module 130 sends the fake LUP message to HLR-H 110, without waiting for the SAI-ACK message (i.e. at step 312). In yet another embodiment of the present invention, ITR module 130 sends the fake LUP message immediately after sending the SRI-SM message (i.e. after step 308) without waiting for the SRI-SM ACK message. If HLR-H 110 retrieves a VMSC (or VLR) location of roamer 106 immediately from a new network location update even before it is completed, then the SRI-SM ACK message will return roamer 106's current VMSC. Once the current VMSC of roamer 106 is retrieved, and a re-registration counter corresponding to an International Mobile Subscriber Identity (IMSI) of roamer 106 is at threshold, then ITR module 130 does not attempt the ITR any further, however, it may optionally provide Value Added Service (VAS) to roamer 106. Some exemplary VAS may be, but not limited to, a Winback SMS, and a Prepaid Local Number service.

In an embodiment of the present invention, ITR module 130 blacklists HLR-H 110 for a pre-defined time interval in absence of a response or in presence of an error message (e.g. system failure or unexpected data value or data missing etc) to the routing request (SRI-SM) for a configurable number of times from HPMN 102. This blacklisting restricts ITR module 130 from sending any further SRI-SM query before each fake LUP message. In other words, when CancelLocation message on roamer 106 is received from HLR-H 110, and if this HLR is blacklisted due to any of the above reasons, ITR module 130 issues fake LUP messages (i.e. at step 314) without sending any routing request (SRI-SM) prior to it.

In another embodiment of the present invention, when a VMSC is returned in the SRI-SM ACK, ITR module 130 may determine whether this VMSC in second VPMN 108 is a non-ITR attempting network, after applying some application logics of pre-defined criteria on the response. Thereafter, ITR module 130 will not send any SRI-SM message prior to subsequent fake LUP messages including the follow-on one, if the fake LUP message is issued after the SRI-SM ACK, to HLR-H 110. In other words, the ITR attempt on the departing roamer 106 will not be abandoned.

In yet another embodiment of the present invention, ITR module 130 blacklists HPMN 102 for a pre-defined time interval, in case HLR associated with HPMN 102 fails to return any VMSC address (i.e. in the SRI-ACK message) in response to the SRI message (i.e. from ITR module 130). This blacklisting allows the operator in first VPMN 104 to restrict ITR module 130 from sending further SRI messages to HLR-H 110. In other words, ITR module 130 issues fake LUP messages without any routing request (i.e. SRI) prior to it. In an exemplary case, if the operator in HPMN 102 has deployed a Short Message Service (SMS) relay mechanism for relaying SMS always through HPMN 102, irrespective of roamer 106's current location, HPMN 102 will always return its own address to ITR module 130 in its SRI-ACK message instead of VMCS address. In such a case, ITR module 130 will blacklist HPMN 102 from issuing any routing request (SRI-SM) prior to fake LUP messages.

In an embodiment of the present invention, an error message is returned in response to ITR module 130's fake LUP message indicating unknown subscriber, Roaming Not Allowed (RNA), Operator Determined Barring (ODB), RNA in location area (due to restriction, regional service subscription, national roaming and the like). In this embodiment, ITR module 130 can blacklist the roamer 106's IMSI for subsequent fake LUP messages, until the IMSI is registered in first VPMN 104 again, thus abandoning the ITR attempt.

In another embodiment of the present invention, VLR-V2 114 may not abort the location update transaction of roamer 106 at second VPMN 108, in case roamer 106's registration with second VPMN 108 is successfully completed. In other words, when HLR-H 110 sends a CancelLocation message to VLR-V2 114, VLR-V2 114 will not acknowledge this message and will retain roamer 106 on second VPMN 108. This effects the mobile communication of roamer 106, as HLR-H 110 has the ITR's fake location address (as VMSC/VLR address) registered in its database and VLR-V2 114 has the knowledge that roamer 106 is still registered with second VPMN 108. Due to this, although roamer 106 is able to initiate Mobile Originated (MO) activities, he is unable to perform any Mobile Terminated (MT) activities. In addition, when ITR module 130 sends the SRI message to HLR-H 110, prior to sending the fake LUP message, the VMSC/VLR address of second VPMN 108 is returned in the SRI-ACK message to ITR module 130. However, in an embodiment of the present invention, if HLR-H 110 does not issue any registration response message, such as CancelLocation, to VLR-V2 114, even after the fake LUP message is sent from ITR module 130 to HLR-H 110, ITR module 130 can blacklist the VMSC/VLR (i.e. returned in the SRI-ACK message). This blacklisting of the VMSC/VLR ensures that first VPMN 104 will not perform any further ITR attempt on roamer 106 in such case.

In order to avoid such a situation, ITR module 130 may opt to send one or more fake LUP messages (i.e. at step 314) successively for a pre-defined number of times to HLR-H 110. This causes either HLR-H 110 to issue an abort message in order to abort the ongoing LUP transaction of roamer 106 with second VPMN 108, or forces VLR-V2 114 to abort the ongoing LUP transaction upon receiving the CancelLocation message from HLR-H 110 for the first set of fake LUP messages. Subsequently, at step 316, HLR-H 110 successfully completes the LUP transaction with first VPMN 104. Therefore, first VPMN 104 is able to retain roamer 106 using the ITRS solution deployed at first VPMN 104. In an embodiment of the present invention, the successful LUP transaction implies exchange of other necessary messages, such as a MAP ISD and a MAP ISD-ACK (according to the underlying protocol) also to be successfully exchanged between first VPMN 104 and HLR 110.

Due to one or more consecutive fake LUP messages (i.e. at step 314) and successful LUP (i.e. at step 316), HLR-H 110 subsequently at step 318, sends an abort message, such as a CancelLocation message to VLR-V2 114, to abort the LUP transaction of roamer 106 at second VPMN 108. Thereafter, at step 320, VLR-V1 114 returns an acknowledgement message, such as TCAP abort to HLR-H 110. Hence, ITR module 130 causes the competitor VLR to abort the LUP transaction with the competitive VPMN. Finally, at step 322, VLR-V2 114 sends a failure message, such as network failure to roamer 106's handset. Examples of network messages from HPMN 102 to second VPMN 108, resulting in a radio message to roamer 106 indicating the network failure are, but not limited to, MAP U/P ABORT, MAP_CLOSE, TCAP abort, and system failure, depending on implementation of the HPMN HLR (i.e. HLR-H 110) and competitive VPMN VLR (i.e. VLR-V2 114).

In an embodiment of the present invention, even after sending one or more consecutive fake LUP messages, detection unit 132 does not detect any CancelLocation message from HLR-H 110 and intended for VLR-V2 114, within the second pre-defined time interval T1 or within the re-registration threshold. In this embodiment, if the fake LUP message is preceded with the routing request message such as SRI-SM, ITR module 130 can blacklist HLR-H 110 and VMSC/VLR-V2 114, and hence abandoning the ITR attempt.

In another embodiment of the present invention, if the ITR attempt is finished (due to the threshold of timers and counters), although not yet successful, then ITR module 130 may send one final SRI-SM to HLR-H 110 to retrieve a VMSC address stored at HLR-H 110. In such a case, HLR-H 110 returns an address of ITR module 130 due to the last sent fake LUP message. Thereafter, ITR module 130 can perform one of the following:

1. ITR module 130 may issue a PurgeMS message to HLR-H 110 on the IMSI of departing roamer 106. This results in HLR-H 110 to have no VMSC/VLR address of roamer 106. Thus, in case of any MT call or SMS, when a routing request is received at HLR-H 110, and HLR-H 110 has no VLR/VMSC address, it will return a message that indicates an unattached mobile (i.e. VMSC/VLR address of roamer 106 is unknown).

2. ITR module 130 may reset the counters and expiration timers for departing roamer 106. In this case, when ITR module 130 detects a new CancelLocation message from HLR-H 110 (maybe due to roamer 106's mobile activities like location area changes, or any MO activities), ITR module 130 will have another chance to redirect roamer 106 back to first VPMN 104. However, in case of incoming calls, ITR module 130 will receive HLR-H 110's Provide Roaming Number (PRN) request. ITR module 130 will return 'Absent Subscriber' message to HLR-H 110, as an acknowledgement to the PRN request message. In case of an incoming SMS, when a Forward SMS is received at ITR module 130 from HLR-H 110, ITR module 130 will send a Forward SMS ACK with 'Absent Subscriber' message to HLR-H 110, so that subsequent incoming calls and SMS do not come to ITR module 130.

Another embodiment of the present invention provides additional criteria for handling a special case of the ITRS solution. In order to handle this special case, the operator in first VPMN 104 defines a configuration distribution control profile among inbound roamers of each HPMN. The configuration distribution control profile supports in decision of performing the ITR attempt. As an exemplary case, ITR module 130 may activate the configuration distribution control profile on each HPMN at different time bands. The configuration distribution control profile for each HPMN is defined based on the following, but not limited to, one or more parameters:

1. Unique inbound roamers: For example, no more than 15% of unique departing inbound roamers from Vodafone™ United Kingdom (UK) are subjected to ITR attempts.

2. Inbound TR attempts: For example, no more than 15% of departing inbound roamers from Vodafone™ United Kingdom are subjected to ITR attempts.

3. Inbound TR success: For example, no more than 30% of departing inbound roamers (i.e. unique or any) from Vodafone™ United Kingdom ITR are subjected to ITR success.

In one embodiment of the present invention, a configurable counter measures these one or more parameters in the configurable distribution control profile. In other words, the distribution measure can be performed for the configurable counter of the corresponding count in each of the above one or more parameters. For example, if the distribution control is on ITR attempts and the configurable counter is set to 10, then the percentage will be measured for every 10 ITR attempts. Therefore, the operator in first VPMN 104 can define $$\text{Success rate} = \frac{\text{Total ITR success counter}}{\text{Total redirection counter}}$$

In another embodiment of the invention, if HLR-H 110 has fraud control in a way that it discards a fake LUP message from ITR module 130, or simply new registration attempts of roamer 106 during another location update transaction of roamer 106, ITR module 130 blacklists HLR-H 110 from future ITR attempts. In yet another embodiment of the invention, the enhanced location-based ITR mechanisms can even be applied to perform network selection for departing roamers going to a new VPMN in another country. In case, the roamer goes back to the home country, the ITR attempt is abandoned. However, it is possible to select networks in the home country, when the operator in HPMN allows the roamer to roam in the home country (i.e. national roaming). In this embodiment of the invention, ITR module 130 attempts to perform the ITR to a third VPMN when the attempt to perform the ITR to first VPMN 104 is unsuccessful. This can be useful for a group alliance, i.e., when the third VPMN is a preferred network to first VPMN 104 as compared to second VPMN 108 which is a non-preferred network for first VPMN 104. Therefore, all the special handling mechanisms defined for ITR mechanism within the country can be similarly applied for the ITR outside the country. Hence, the ITRS solution allows the VPMN operator to redirect the roamer to any network of his choice by identifying location of the roamer.

Figure 4:
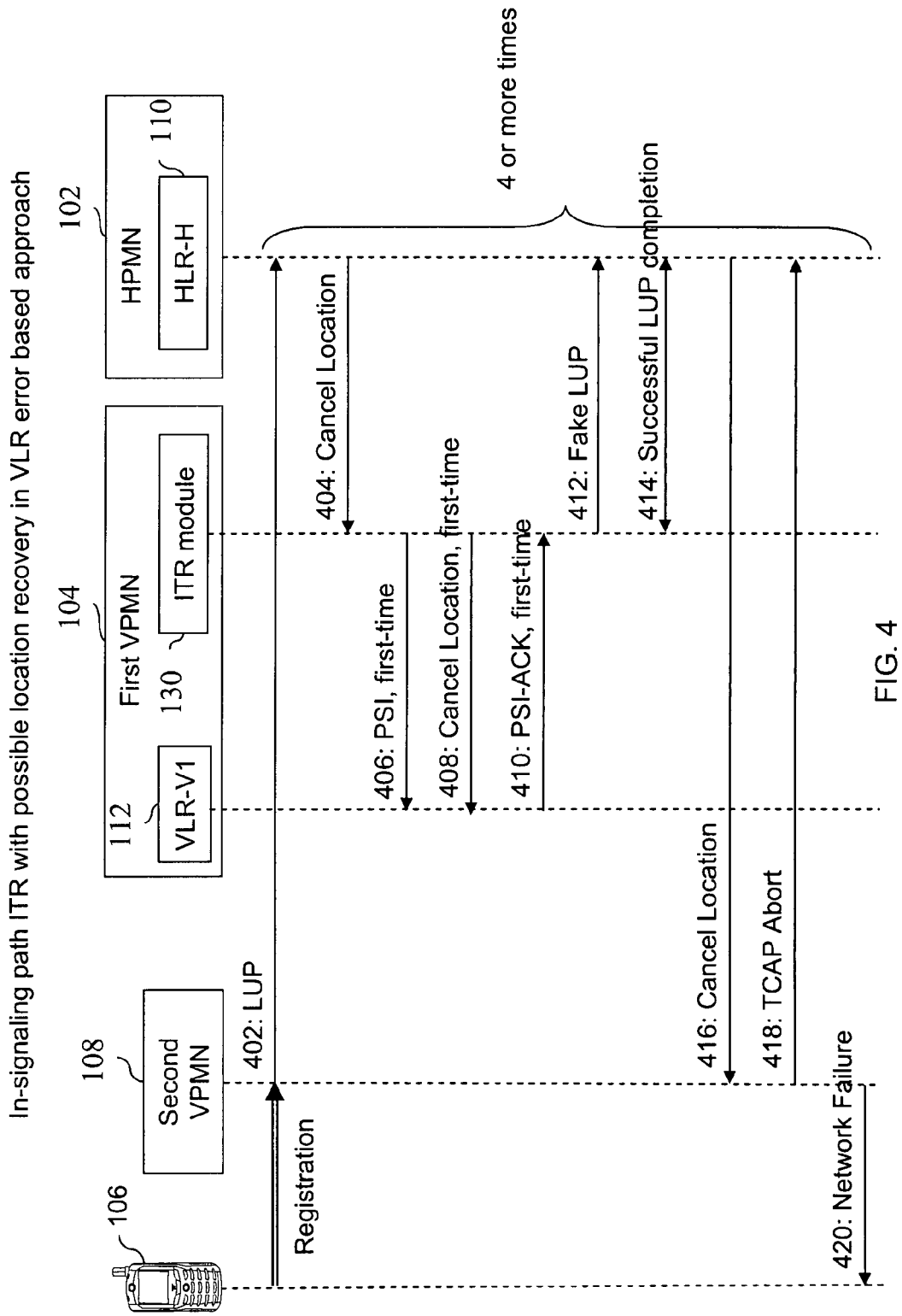
FIG. 4 represents a flow diagram for providing location recovery based ITR in the VLR error based approach, in accordance with an embodiment of the present invention.

FIG. 4 represents a flow diagram for providing location recovery based ITR in the VLR error based approach, in accordance with an embodiment of the present invention. In case roamer 106 leaves the country of first VPMN 104 that is deploying ITR module 130, ITR module 130 attempts to identify the new location of roamer 106. The possible change in the registration of roamer 106 is inferred when an LUP message is received at HPMN 102 from second VPMN 108. At step 402, VLR-V2 114 sends the LUP message to HLR-H 110. VLR-V2 114 sends this LUP message, after roamer 106 attempts to (or is forced to attempt to) register with second VPMN 108. Thereafter, at step 404, ITR module 130 detects a possible change in registration of roamer 106, upon receipt of a CancelLocation message at first VPMN 104 from HLR-H 110. In this case, the first CancelLocation message received at first VPMN 104 is held at ITR module 130. ITR module 130 may identify a blind spot in first VPMN 104 due to which roamer 106 has attempted to register with second VPMN 108. Therefore, at step 406, ITR module 130 sends a Provide Subscriber Information (PSI) message as the subscriber information message to VLR-V1 112 before relaying the first registration cancellation message (i.e. CancelLocation) to VLR-V1 112 at step 408. Thereafter, VLR-V1 112 may page roamer 106 in anticipation of a reply from roamer 106 indicating a current cell location in first VPMN 104. Thereafter, at step 410, VLR-V1 112 sends an acknowledgement message, such as PSI-ACK, returning the location of roamer 106. In another embodiment of the present invention, or in case there is no response to the paging, VLR-V1 112 simply returns the last known cell location (i.e., the cell where roamer 106 was previously located) to ITR module 130. All these variations intend to gain a rough idea of the blind spots where the roamer was about to be lost from first VPMN 104. In yet another embodiment of the present invention, ITR module 130 may relay the CancelLocation message (at step 408) to VLR-V1 112, even before it receives an acknowledgment to the PSI message. It will be apparent to a person skilled in the art, that the PSI-ACK message will be processed independent of the current ITR attempt.

Further, at step 412, ITR module 130 continues the ITR attempt by sending fake LUP messages to HLR-H 110. Upon exchange of some standard MAP messages between HLR-H 110 and ITR module 130, at step 414, the registration process completes successfully with HLR-H 110. The completion of successful registration process between first VPMN 104 and HPMN 102 causes the competitor VLR abort. Hence, at step 416, HLR-H 110 sends a CancelLocation message to VLR-V2 114, to abort the registration attempt of roamer 106 at second VPMN 108. Thereafter, at step 418, VLR-V2 114 acknowledges the abort, by returning a TCAP abort message to HLR-H 110. This causes VMSC/VLR-V2 114 to generate a Network Failure error (#17) at roamer 106's handset, at step 420.

Figure 5:
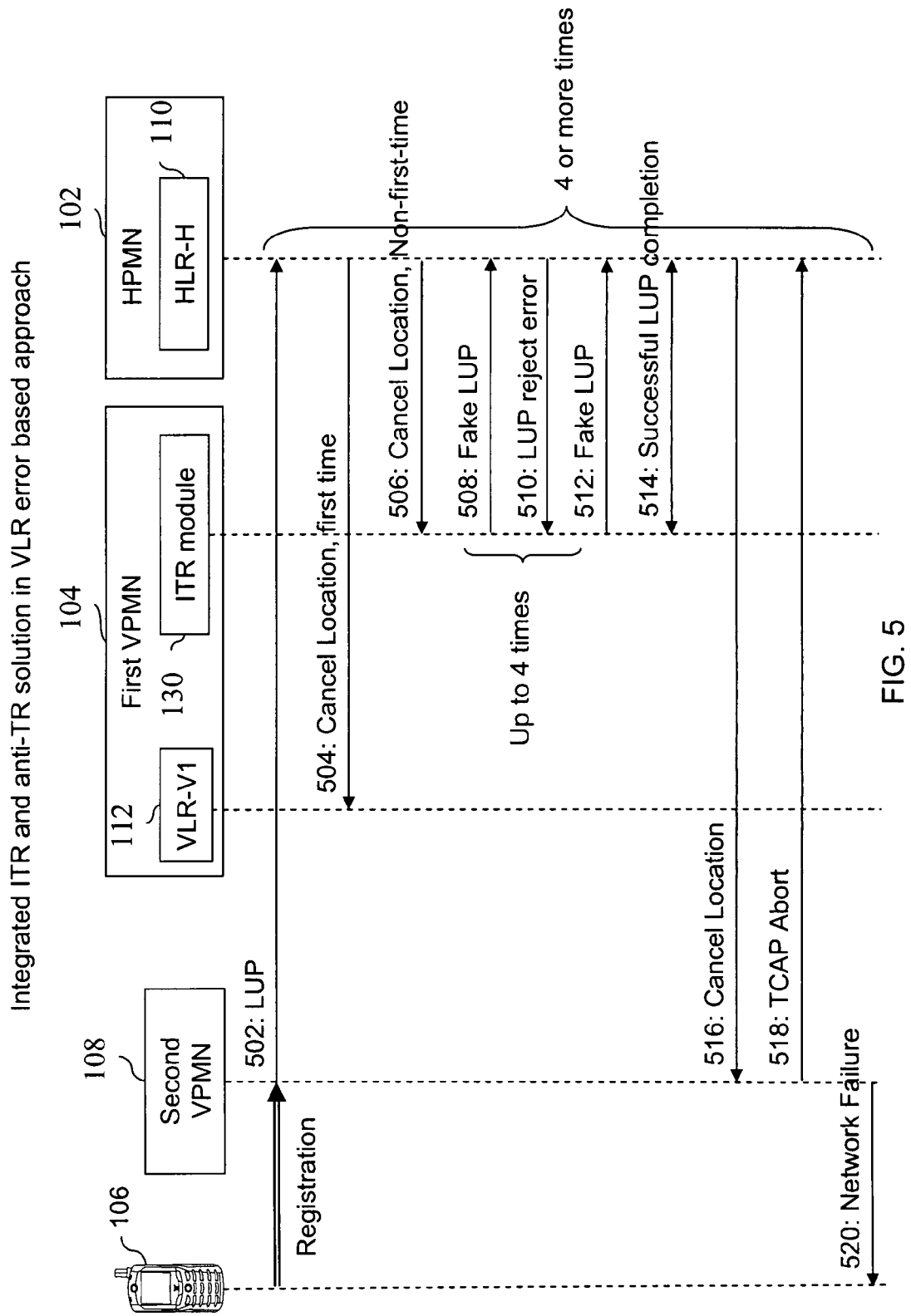
FIG. 5 represents a flow diagram for performing ITR in conjunction with countering of TR attempt initiated by the HPMN in the VLR error based approach, in accordance with an embodiment of the present invention.

As described earlier in FIG. 1, there may be a case where the operator in HPMN 102 deploys a TR solution against one or more VPMN(s). FIG. 5 represents a flow diagram for performing the ITR in conjunction with countering the TR attempt initiated by the HPMN in the VLR error based approach, in accordance with an embodiment of the present invention. In this embodiment, we have assumed that HPMN 102 is deploying the TR solution against first VPMN 104. The possible change in the registration of roamer 106 is inferred when an LUP message is received at HPMN 102 from second VPMN 108. At step 502, HLR-H 110 receives the LUP message from VLR-V2 114. Thereafter, at step 504, detection unit 132 detects a possible change in registration of roamer 106, upon receipt of a CancelLocation message at first VPMN 104 from HLR-H 110. Detection unit 132 can therefore deduce that roamer 106 is attempting to register with second VPMN 108. At step 506, HLR-H 110 sends another CancelLocation message that is tapped by ITR module 130. Further, at step 508, ITR module 130 attempts to redirect the inbound roamer's traffic to first VPMN 104 by sending fake LUP messages from ITR module 130 to HLR-H 110. In this embodiment of the present invention (as explained earlier in FIG. 1), the operator in first VPMN 104 deploys an anti-TR unit to counter the TR attempts from HPMN 102, based on one or more acknowledgement messages sent by HPMN 102 in response to the fake LUP messages from first VPMN 104. At step 510, HPMN 102 (i.e. a TR unit deployed at HPMN 102, or HLR-H 110 itself) sends an acknowledgement message, such as an LUP reject error message to ITR module 130. The examples of error in the LUP reject error message include system failure, Unexpected Data Value (UDV), Missing Data (MD) and the like. In another embodiment of the present invention, the acknowledgement message is an LUP abort error message. In case any of the two messages are received as the acknowledgement messages, ITR module 130 continues to send fake LUP messages, until a successful LUP transaction is completed or a threshold (e.g. T0) is reached. In an embodiment of the present invention, ITR module 130 sends the fake LUP message to HLR-H 110, up to four times. Based on the attributes in the acknowledgement message (i.e. at step 510), ITR module 130 decides whether to apply anti-TR solution or to abandon the ITR attempt.

The acknowledgement message may contain a UDV, Roaming Not Allowed (RNA), Roaming Restricted (RR), System Failure (SF), MD or any other error as the attribute. According to the configuration of the ITR deploying VPMN operator, in case the LUP reject error contains the UDV (which is an IR 73 compliant TR error) from a dedicated HPMN GT, ITR module 130 may abandon its current ITR attempt. An HPMN GT is considered dedicated for the TR using UDV, if it is the only GT used for sending UDV in the TR solution at HPMN 102. However, if the LUP reject error is SF or MD (which are non-compliant to IR 73), then the anti-TR solution (i.e. anti-non-compliant TR solution) may be applied along with the current ITR attempt. The anti-TR unit is referred to as anti-non-compliant TR solution in a VPMN if the anti-TR unit is only applied to non-compliant errors (such as system error and missing values) used by an HPMN TR solution. The integrated ITR and Anti-TR solution works for both active monitoring and passive monitoring mode.

In case the attribute in the acknowledge message is RNA or RR, the ITRS solution is modified in a way that ITR module 130 immediately retries until a successful transaction or a threshold is reached, as it can be deduced that HPMN 102 is applying TR on roamer 106. In this case, the current ITR attempt may be abandoned. This solution works for both active and passive mode ITR. To confirm that HPMN 102 is performing TR, the decision to abandon the ITR might be concluded only after RNA is received in the acknowledgement message for a configurable number of successive times of the fake LUP messages on roamer 106.

Based on the acknowledgment received in LUP reject error message, at step 512, ITR module 130 once again sends a new fake LUP message to HPMN 102. Thereafter, at step 514, HPMN 102 completes the registration process with first VPMN 104 to allow roamer 106 to register with first VPMN 104. This causes HPMN 102, at step 516, to send a CancelLocation message to VMSC/VLR-V2 114. VMSC/VLR-V2 114 at step 518 returns an acknowledgement message, such as a TCAP abort to HPMN 102. Finally, at step 520, VMSC/VLR-V2 114 sends a network failure at roamer 106's handset.

In an embodiment of the present invention, an Over The Air (OTA) based approach may exist, that either modifies a preferred PLMN list or special SIM entries to initiate network reselection by roamer 106's handset. The anti-TR unit may deal with this OTA based case independently, since it does not have to be tied with location update transaction (or process). In another embodiment of the present invention, in the active monitoring mode, the ITR attempt can be combined with a Gateway Location Register (GLR) based technology. The GLR based technology uses a GLR unit deployed in a hosting location by an international SS7 carrier or a common carrier for multiple VPMN operators. In one embodiment of the present invention, the GLR unit can be integrated with the ITR module in a same platform in such a way that the GLR can either be independently applied outside the ITR or dependently applied inside the ITR. In an embodiment of the present invention, after the inbound roamer of TR applying HPMN (i.e. HPMN 102) has successfully registered with first VPMN 104, the GLR unit can also periodically issue several fake LUP messages on the retained roamer's IMSI in order to distort the HPMN distribution profile on the roamers. This will increase the chance of more roamers of HPMN 102 registering at first VPMN 104.

However, this GLR solution will not be effective against an HPMN TR solution that is based on a distribution control of unique roamers across VPMNs (i.e. in a visiting country) or on a percentage of LUP reject error for individual VPMN in a visiting country. In one embodiment of the present invention, this solution allows the operator in first VPMN 104 to retain initially registered roamers on its network. However, it does not consider a case when new roamers attempt to register with first VPMN 104. Hence, in order to allow more inbound roamers to register with first VPMN 104, the operator in first VPMN 104 can dynamically swap in and swap out the retained roamers using a GLR caching mechanism. In one embodiment of the present invention, the operator in first VPMN 104 may opt to retain, via the GLR caching, the inbound roamers that generate more revenues while roaming in first VPMN 104, as compared to those that do not generate similar revenues. This causes the location update of inbound roamers, who are not cached by the GLR, to go back to HPMN 102 and be subjected to possible TR. Therefore, the operator in first VPMN 104 will achieve better revenues for the retained roamers without affecting the HPMN TR distribution mechanism (unless the HPMN TR distribution mechanism is itself based on revenue distribution).

Alternatively, ITR module 130 can send one or more fake LUP messages on a departing roamer's IMSI, using the VMSC/VLR address obtained from the SRI-SM, when it is known that the departing roamer has registered with a competitor network (i.e. second VPMN 108). This fake LUP message will not affect the services of the departing roamer in second VPMN 108, as the VLR/VMSC address used is the actual VMSC/VLR address of second VPMN 108. In an embodiment of the present invention, ITR module 130 sends the fake LUP messages using VLR/VMSC address of second VPMN 108, to HPMN 102 for a pre-defined number of times (i.e. configured by the operator in first VPMN 104). The intention is to create a fake distribution image at HPMN TR solution, so that HPMN 102 assumes that the competitor VPMN (i.e. second VPMN 108) has exceeded its share of traffic distribution. This results in HPMN 102 re-distributing the share of roamers to the ITR deploying first VPMN 104. Since, first VPMN 104 has sent the fake LUP message to HPMN 102 using the VMSC/VLR address of second VPMN 108, HPMN 102 will send a response message to second VPMN 108, which will be aborted by second VPMN 108.

Figure 6:
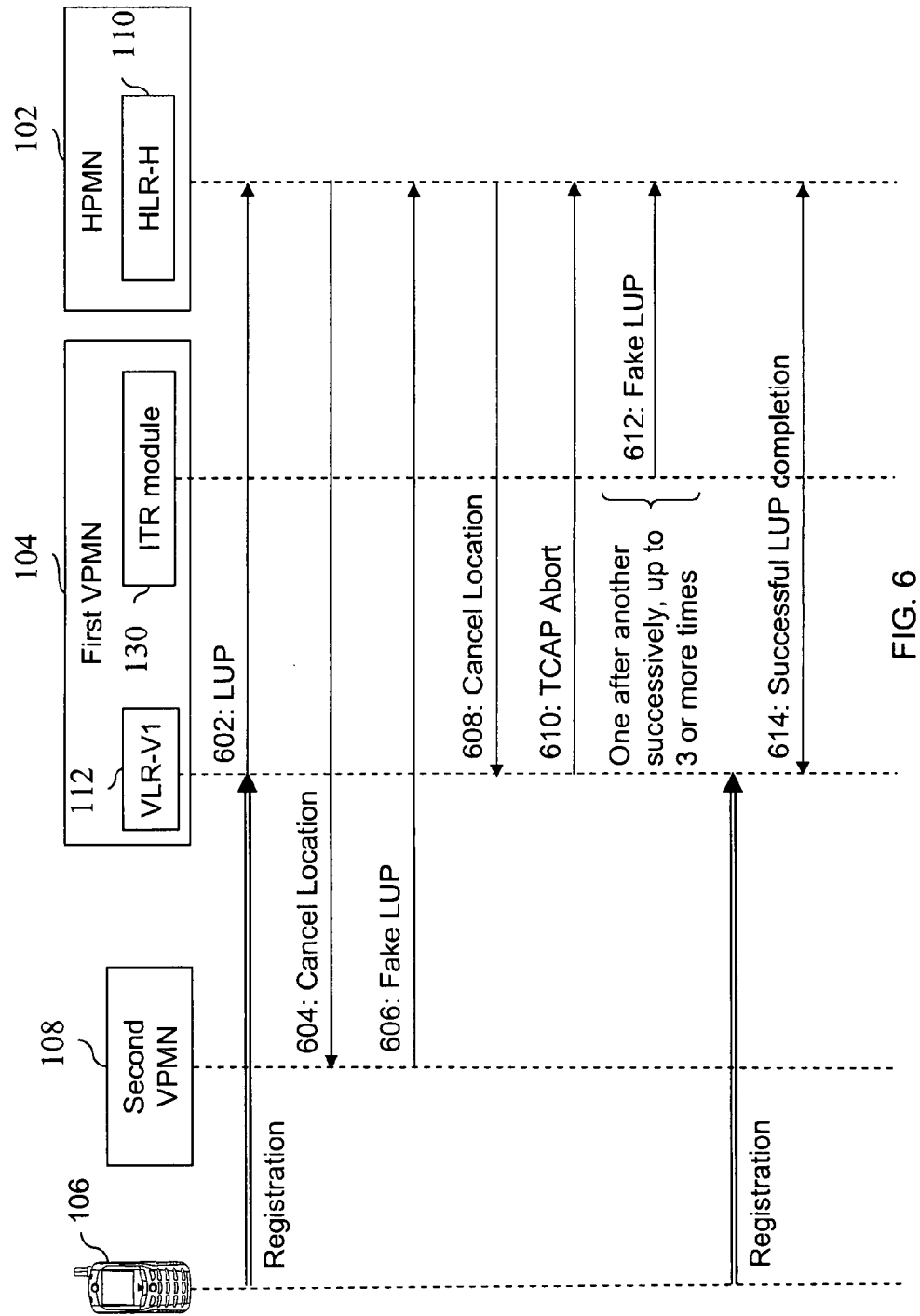
FIG. 6 represents a flow diagram for performing the ITR to counter an ITR attempt from a competitor network, in accordance with an embodiment of the present invention.

In one embodiment of the invention, second VPMN 108 may also deploy the ITRS solution for redirecting roamer 106's traffic to its network. In this embodiment, second VPMN 108 may optionally include an ITR module, which may be similar to ITR module 130. FIG. 6 represents a flow diagram for performing the ITR to counter an ITR attempt from a competitor network, in accordance with an embodiment of the present invention. This embodiment assumes that roamer 106 (i.e. in this embodiment) is initially registered with second VPMN 108. However, when roamer 106 attempts to register with first VPMN 104, at step 602, VMSC/VLR-V1 112 sends an LUP message to HLR-H 110. This causes HLR-H 110 to issue a CancelLocation message to VMSC/VLR-V2 114 in second VPMN 108, at step 604. Thereafter, at step 606, the ITR module in second VPMN 108 sends a fake LUP message to HLR-H 110. At step 608, HLR-H 110 sends a CancelLocation message to first VPMN 104 (i.e. received at VLR-V1 112). Thereafter, at step 610, VLR-V1 112 returns a TCAP abort message to HLR-H 110, to abort roamer 106's registration attempt at first VPMN 104. However, upon receiving the CancelLocation message (i.e. at step 608), ITR module 130 can deduce the presence of the ITR module at second VPMN 108 that is performing an ITR attempt in second VPMN 108 to retain its inbound roamer from leaking to first VPMN 104. Hence, to thwart second VPMN 108's ITR attempt, at step 612, ITR module 130 sends a fake LUP message three or more times in succession to defeat second VPMN 108's ITR attempt. Finally, at step 614, HPMN 102 successfully completes the registration process with first VPMN 104, to allow roamer 106 to register at first VPMN 104. As a successful transaction is recorded at HLR-H 110, the ITR module in second VPMN 108 perceives that the handset is in manual mode or second VPMN 108 has no coverage, and thereby abandoning any further ITR attempts.

In an embodiment of the present invention, roamer 106's handset may even get stuck after ITR module 130 attempts for four times and still roamer 106 is not able to register back to first VPMN 104. Since, HLR-H 110 knows an address of ITR module as the VMSC/VLR address of first VPMN 104, roamer 106 will not be able to receive any calls and SMS on his handset. In an embodiment of the present invention, ITR module 130 removes its own address from HLR-H 110, by sending a registration location detached message, such as a MAP PurgeMS to HLR-H 110. In another embodiment of the present invention, some of the HLRs send a CancelLocation message to first VPMN 104 after roamer 106 is successfully registered with second VPMN 108. In this embodiment, upon receiving the CancelLocation message at first VPMN 104 and being unaware of roamer's registration with second VPMN 108, ITR module 130 sends a fake LUP message to HLR-H 110, which will then send a CancelLocation message to second VPMN 108. As second VPMN 108 will not send any network failure to roamer 106's handset, roamer 106's handset is unaware of CancelLocation and may get stuck for receiving any calls and SMS. It will be apparent to a person skilled in the art, that the MO activities of roamer 106 will not be affected due to any of the two stuck handset cases, and hence roamer 106 will still be able to initiate MO calls and SMS. Therefore, a mechanism is required to handle the two cases of handset stuck in order to allow MT calls and SMS for the roamer. This mechanism is based on sending the routing request, such as SRI, SRI-SM and ATI, prior to sending the fake LUP message from ITR module 130 to HLR-H 110.

Figure 7A:
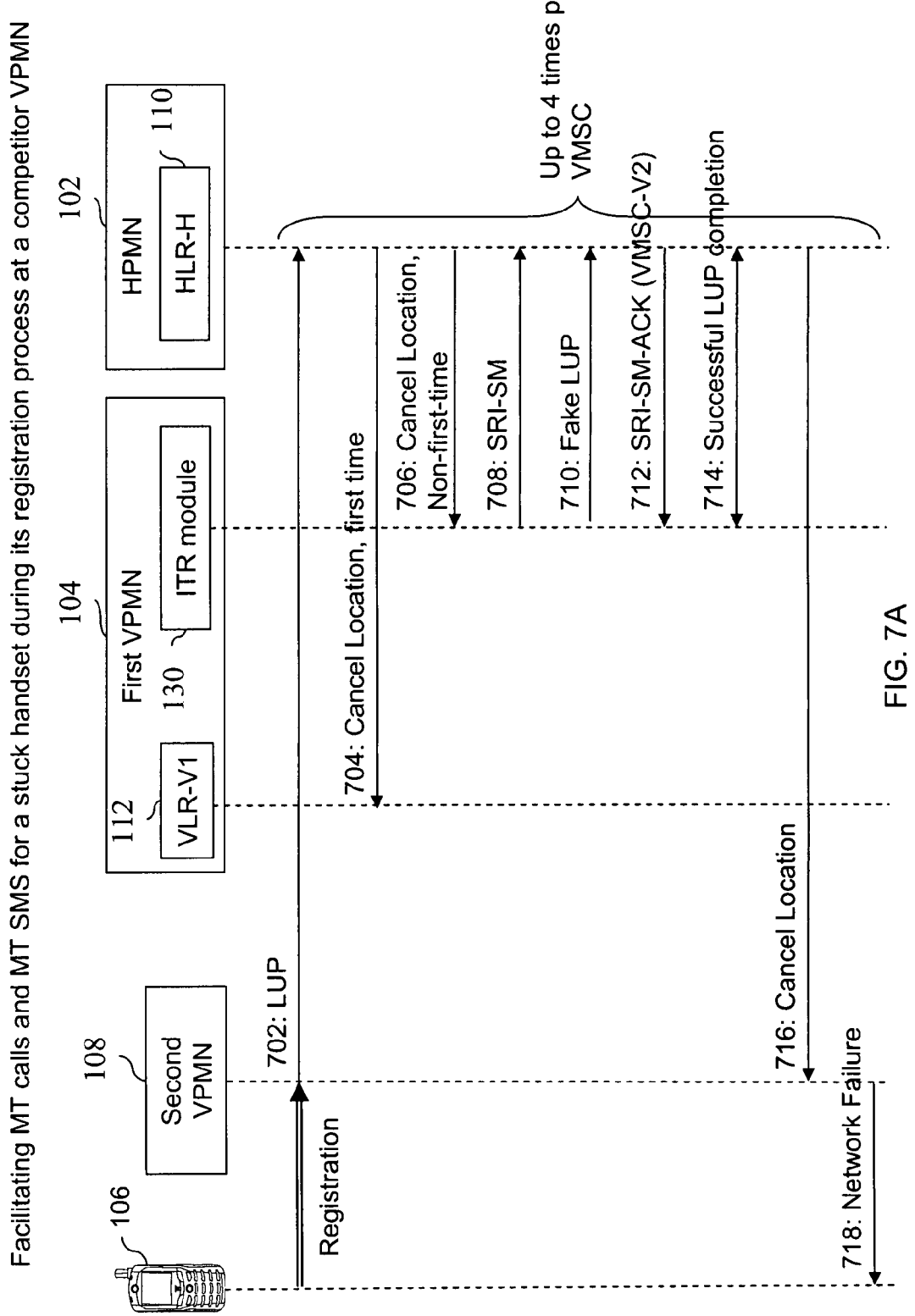
FIGS. 7A, 7B, and 7C represent a flow diagram for handling a stuck handset case, when the roamer's handset is stuck during its registration attempt at the competitor network, in accordance with a first embodiment of the present invention.
Figure 7B:
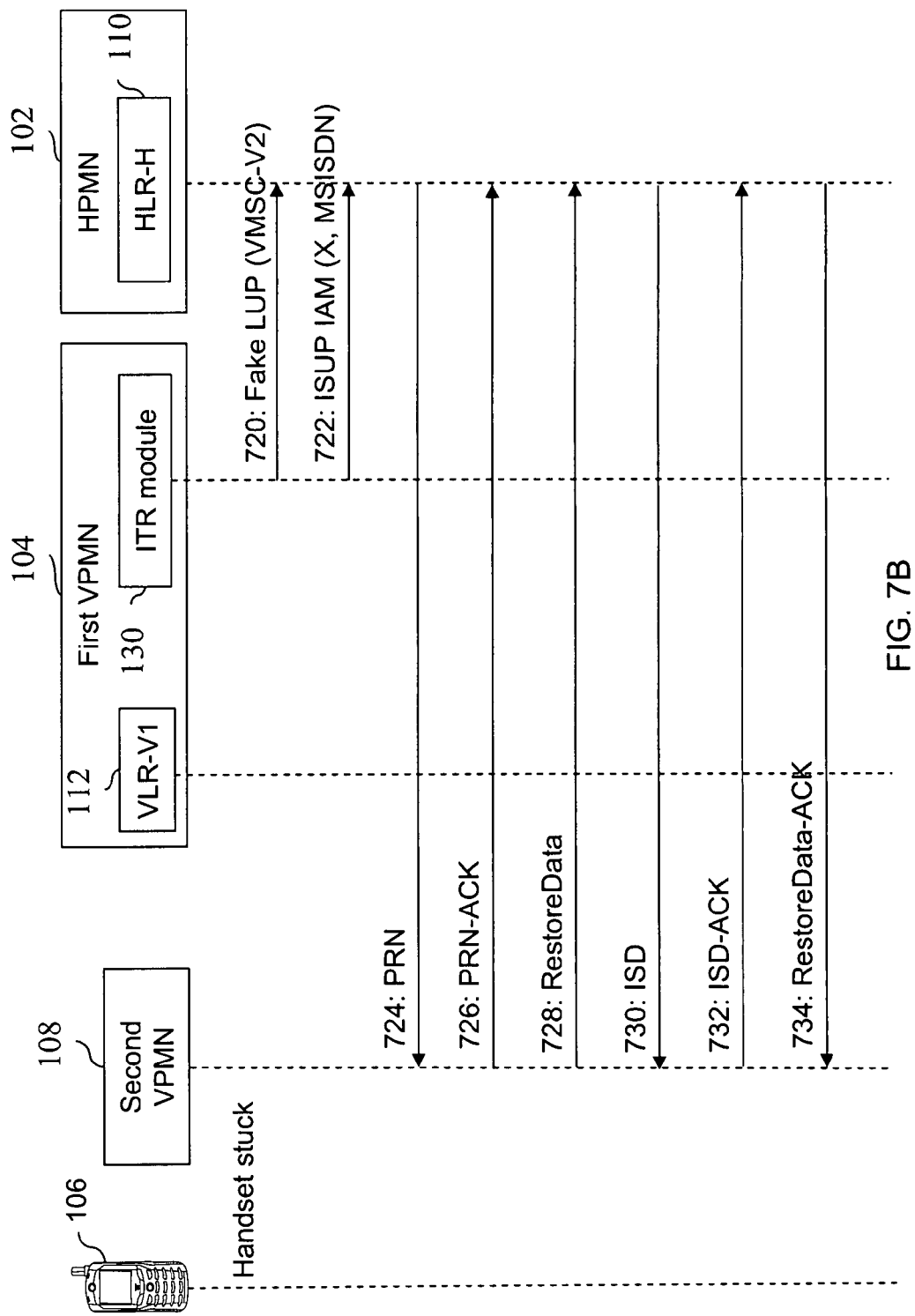
Figure 7C:
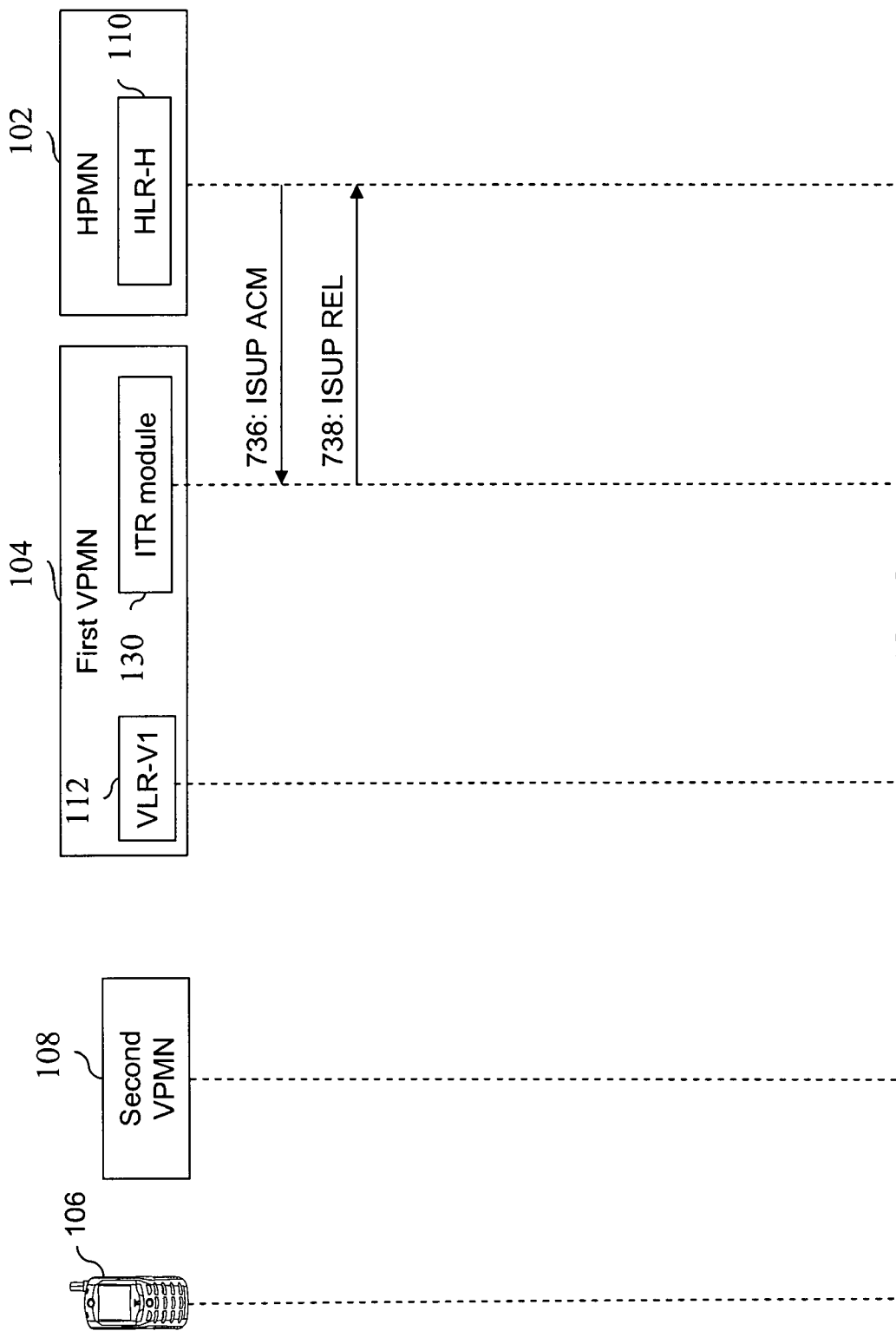

FIGS. 7A, 7B, and 7C represent a flow diagram for handling a stuck handset case, when the roamer's handset is stuck during its registration attempt at the competitor network, in accordance with a first embodiment of the present invention. Roamer 106 attempts to (or is forced to attempt to) register with second VPMN 108 due to one or more reasons as described above. At step 702, VLR-V2 114 sends an LUP message to HLR-H 110. At step 704, HLR-H 110 sends the one or more registration cancellation messages, such as CancelLocation message to VLR-V1 112, to abort roamer 106's registration with first VPMN 104. Detection unit 132 detects the receipt of the CancelLocation message at first VPMN 104. At step 706, HLR-H 110 sends another CancelLocation message. However, this time ITR module 130 taps the CancelLocation message.

Thereafter, at step 708, ITR module 130 sends an SRI-SM message to HLR-H 110, to retrieve a VMSC/VLR address of roamer 106. At step 710, ITR module 130 attempts to redirect the traffic to first VPMN 104 by sending the fake LUP messages to HLR-H 110. In an embodiment of the present invention, ITR module 130 sends the fake LUP message to HLR-H 110, without waiting for an SRI-SM ACK message from HLR-H 110. At step 712, HLR-H 110 returns the SRI-SM ACK message to ITR module 130 that provides a VMSC/VLR address of second VPMN 108 to ITR module 130. The VMSC/VLR address is provided because of the previous LUP message from second VPMN 108 that updated HLR-H 110 with its VMSC/VLR address.

For each registration cancellation message detected, ITR module 130 sends the one or more fake LUP messages within a first pre-defined interval of time (T0) until one registration message is recorded as a successful transaction. At step 714, HPMN 102 successfully completes the registration process of roamer 106 with first VPMN 104, which causes HLR-H 110 to send a CancelLocation message to second VPMN 108, at step 716. At step 718, VMSC/VLR-V2 114 in second VPMN 108 generates a network failure at roamer 106's handset, causing roamer 106's handset to be stuck for any further MT activities.

The mechanism that handles the stuck handset case, uses the VMSC/VLR address of second VPMN (i.e. VMSC/VLR-V2 114) i.e., retrieved at step 712, to allow roamer 106 to receive MT calls and SMS on his handset, thereby facilitating roamer 106's mobile communication in second VPMN 108. At step 720, ITR module 130 sends a new registration message, i.e. a new fake LUP using the VMSC/VLR-V2 address to HLR-H 110. This replaces a previous VMSC/VLR address stored at HLR-H 110 with the VMSC/VLR-V2 address of roamer 106. Since, HLR-H 110 now has the actual VMSC/VLR address of roamer 106, MT calls on an MSISDN of roamer 106 are possible. In an embodiment of the present invention, when a GMSC associated with HPMN 102 receives a call request, intended for roamer 106's MSISDN, the GMSC sends a routing request message, such as SRI to HLR-H 110, which issues a MAP PRN request to VMSC/VLR-V2 114. VMSC/VLR-V2 114 will return a Mobile Station Roaming Number (MSRN) corresponding to roamer 106's MSISDN, to HLR-H 110. Second VPMN 108 and HPMN 102 will exchange signaling messages like MAP RestoreData and MAP ISD to retrieve roamer 106's profile information at VMSC/VLR-V2 114. Since, VMSC/VLR-V2 114 has no information about the location area of roamer 106 and any radio contact for establishing the ongoing call in second VPMN 108, VMSC/VLR-V2 114 uses a MAP SearchMS message to determine the exact location of roamer 106. Therefore, the MT call on roamer 106's MSISDN is successfully established using the present mechanism.

In an MT SMS case, when a ForwardSMS is received at VMSC/VLR-V2 114 and it has no record of roamer 106's current location in second VPMN 108; it will not issue any MAP signaling messages, such as RestoreData and SearchMS, as done in the case of MT call on roamer 106's MSISDN. Thus, the SMS will not be delivered to roamer 106's handset. Even though the roamer is unable to receive the MT SMS, he can still receive the SMS later, i.e., when his handset is not stuck. This is because the SMS delivery uses store and forward technique, where the SMSC of the roamer's home network stores this SMS and delivers the SMS when the roamer registers back with a network (like first VPMN or second VPMN).

In an alternate embodiment of the present invention, ITR module 130 can initiate a call setup request, towards roamer 106's MSISDN to cause restoration of roamer 106's profile information at VMSC/VLR-V2 114. Hence, at step 722, ITR module 130 initiates the call setup request, such as ISUP IAM, towards HLR-H 110, using a fake number ('X') as a calling party address (CgPA) and roamer 106's MSISDN as the called party address (CdPA). In an embodiment of the present invention, this fake call setup request is sent immediately after sending the new fake LUP message (i.e. at step 720) from ITR module 130 to HLR-H 110. At step 724, HLR-H 110 sends a PRN request to VMSC/VLR-V2 114, which returns a PRN-ACK message to HLR-H 110, at step 726. Thereafter, at step 728, VMSC/VLR-V2 114 sends a RestoreData message to HLR-H 110, which sends an ISD message back to VMSC/VLR-V2 114, at step 730, in order to update VMSC/VLR-V2 114 with roamer 106's profile information. VMSC/VLR-V2 114 returns an acknowledgement message, such as ISD-ACK, to HLR-H 110 at step 732.

Further, at step 734, HLR-H 110 returns an acknowledgement message, such as RestoreData-ACK message, to VMSC/VLR-V2 114 (in response to the RestoreData message, i.e., at step 728). At step 736, HLR-H 110 sends an ISUP Address Completion Message (ACM) to ITR module 130, to confirm that the trunks are reserved for the call setup. Finally, at step 738, ITR module 130 releases the ongoing call by sending a release message, such as an ISUP REL, to HLR-H 110. In an embodiment of the present invention, in case ITR module 130 does not detect any ISUP REL message, it sends the ISUP REL message to HLR-H 110, immediately after receiving the ISUP ACM message. In another embodiment of the present invention, in order to avoid jamming the switch circuits or incurring charges, ITR module 130's fake ISUP IAM message can be immediately followed by an ISUP REL message, after a pre-defined configurable time interval has passed. This time interval is configurable by the operator in first VPMN 104.

In another embodiment of the present invention, ITR module 130 can send a roaming number query to HLR-H 110, to cause restoration of roamer 106's profile information at VMSC/VLR-V2 114. In this solution, ITR module 130 sends a MAP PRN on the VMSC/VLR-V2 114 (i.e. retrieved at step 712) with a Signal Connection Control part (SCCP) Called Party address (CdPA) Sub System Number (SSN) set to 7 (i.e. VLR type). However, this solution is possible only if the two competitor networks (i.e. first VPMN and second VPMN) allow direct SS7 interactions, and the VMSC/VLR-V2 114 does not check whether the PRN requesting party has a roaming relationship with its VPMN (i.e. second VPMN 108). Then, VMSC/VLR-V2 114 issues RestoreData message to HLR-H 110, to gain roamer 106's profile information, when the roamer 106's handset is stuck in second VPMN 108. This solution will avoid the requirement of tying up the voice trunks and possibly incurring charges due to early call forwarding or late call forwarding.

Another alternative is for ITR module 130 to send a routing information query to HLR-H 110, to cause restoration of roamer 106's profile information at VMSC/VLR-V2 114. In this solution, ITR module 130 sends a MAP SRI message on roamer 106's MSISDN, to HPMN 102. Again, VMSC/VLR-V2 114 will issue a RestoreData message to HLR-H 110, in order to gain stuck roamer 106's profile information. It will be apparent to a person skilled in the art that, many networks block SRI query from another network. This alternate solution will be applicable in cases where the network does not block the SRI query from another network. In yet another embodiment of the present invention, the fake ISUP message approach can be applied to a stuck roamer of a network optionally based on percentage distribution as per the operator's configuration. For example, a maximum of five fake ISUP messages in an hour for a network X or only 5% of stuck handsets of network X will be issued fake ISUP messages.

Figure 8A:
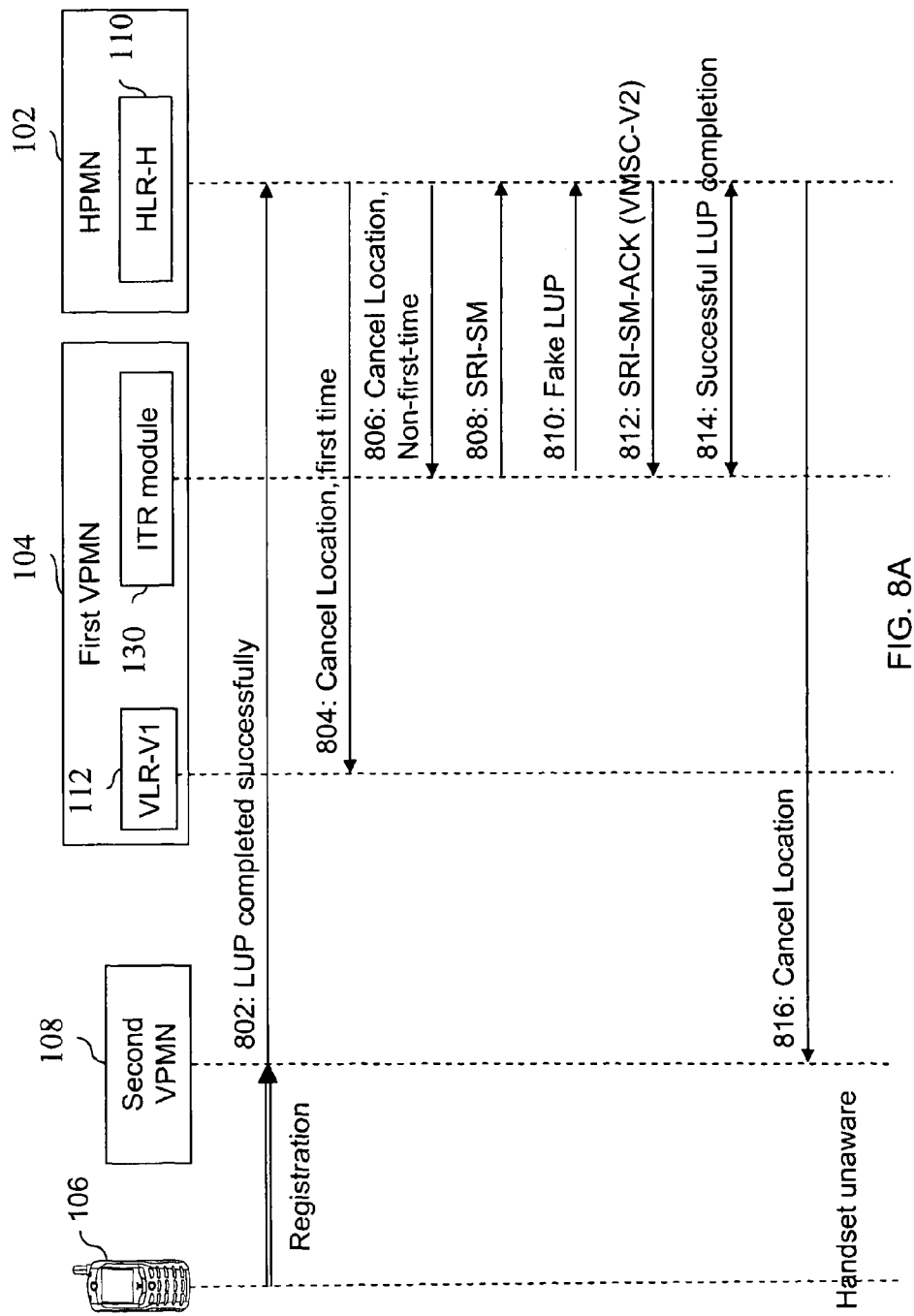
FIGS. 8A, 8B, and 8C represent a flow diagram for handling a stuck handset case, when the roamer's handset is stuck after it is successfully registered at the competitor network, in accordance with a second embodiment of the present invention.
Figure 8B:
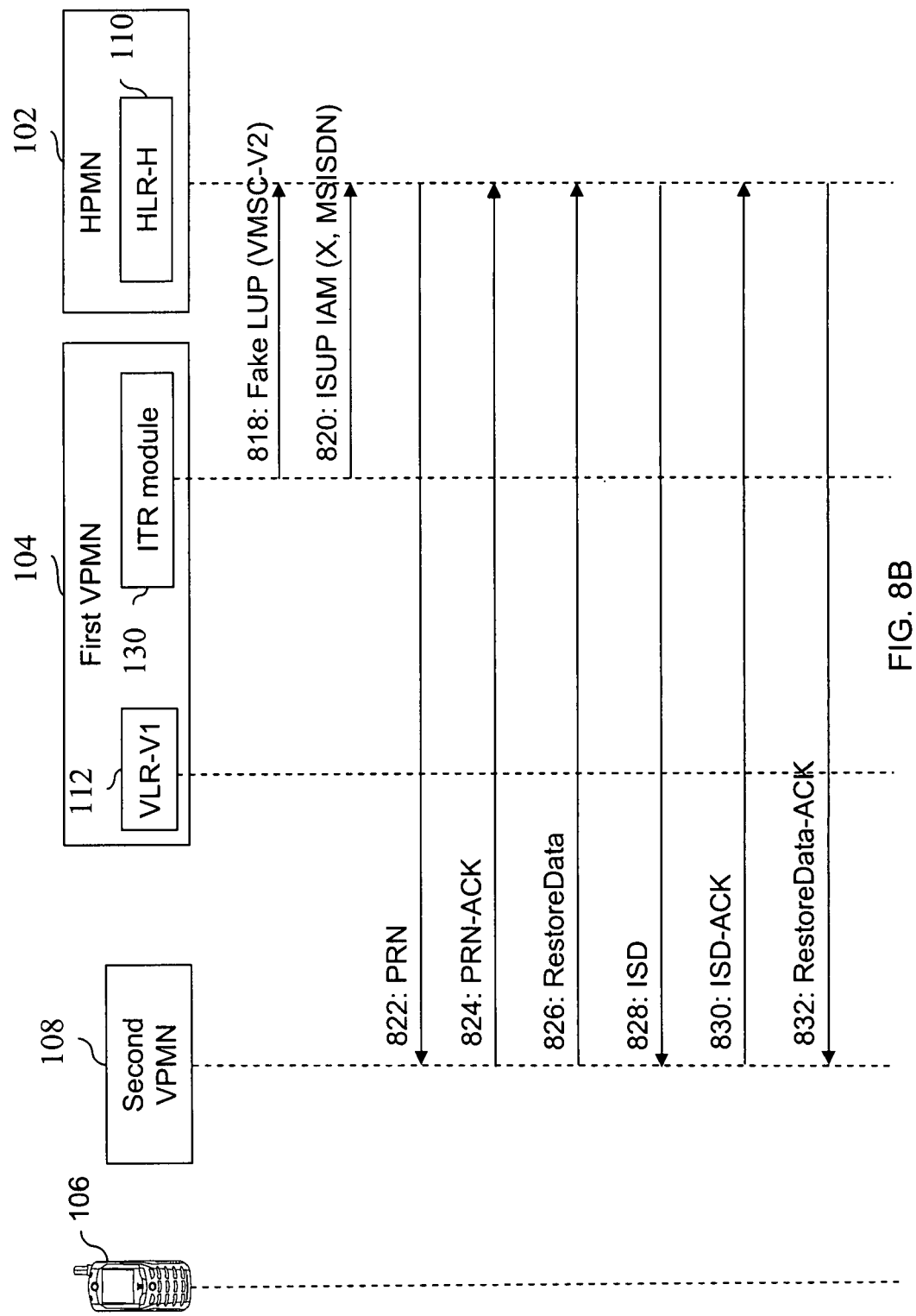
Figure 8C:
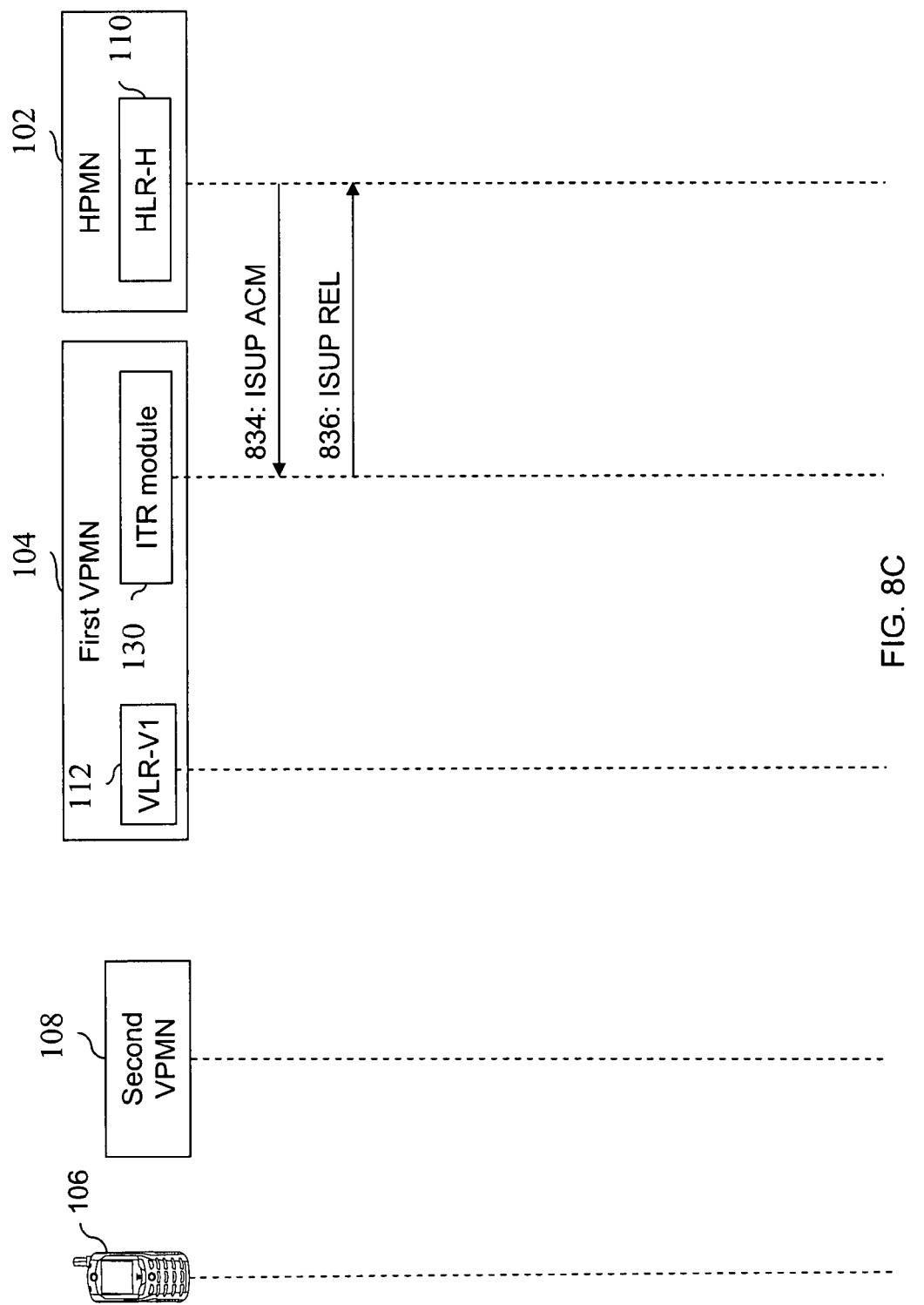

FIGS. 8A, 8B, and 8C represent a flow diagram for handling a stuck handset case, when the roamer's handset is stuck after it successfully registers with the competitor VPMN network, in accordance with a second embodiment of the present invention. In this embodiment the roamer's handset is unaware of the CancelLocation message received at second VPMN 108 from HPMN 102, as roamer has successfully completed its registration process with second VPMN 108, prior to receiving this CancelLocation message. At step 802, second VPMN 108 successfully completes the registration process with HPMN 102. Steps 804 to 816 are similar to steps 704 to 716, in which first VPMN 104 receives a CancelLocation message to abort the roamer 106's registration with first VPMN 104. However, in this embodiment, ITR module 130 is not aware that roamer 106 is already registered with second VPMN 108. Upon receiving a CancelLocation message from HPMN 102, ITR module 130 sends an SRI to retrieve a VMSC/VLR address in second VPMN 108, followed by the fake LUP messages to HLR-H 110 to complete the registration process with first VPMN 104. This causes, HLR-H 110 to send a CancelLocation message to second VPMN 108, at step 816.

Now, since roamer 106 is already registered with second VPMN 108, VMSC/VLR-V2 114 neither responds to the CancelLocation message from HLR-H 110, nor does it send any failure message, such as network failure at roamer 106's handset. In other words, roamer 106's handset is unaware that it got stuck. Therefore, roamer 106's handset is unable to perform any MT activities, such as MT calls and MT SMS. Rest of the steps 818 to 836 are also similar to steps 720 to 738, where ITR module 130 sends a new fake LUP message to HLR-H 110, using the VMSC/VLR-V2 address to update HLR-H 110 with the real VMSC/VLR address. Further, ITR module 130 may initiate a fake call setup to allow MT calls on roamer 106's MSISDN. In addition, various embodiments for the MT SMS and the MT call on the roamer's MSISDN as explained in FIGS. 7A, 7B, and 7C are also applicable for FIGS. 8A, 8B, and 8C.

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

A computer usable medium provided herein includes a computer usable program code, which when executed, redirects roaming traffic of a roamer associated with an HPMN. The computer program product further includes a computer usable program code for detecting by a detection unit coupled to a first VPMN, a registration attempt of the roamer at a second VPMN, upon receipt of a first registration cancellation message of one or more registration cancellation messages that is sent by the HPMN. The computer program product further includes a computer usable program code for sending one or more registration messages to the HPMN from a redirection unit coupled to the first VPMN to cause the HPMN to send a registration response message to a VLR associated with the second VPMN, to thwart the registration attempt of the roamer at the second VPMN. The redirection unit further facilitates the roamer's mobile communication when the roamer's handset gets stuck in the second VPMN.

A VPMN operator uses one or more variations of the present invention to allow him to perform traffic redirection on the inbound roamers of HPMN, in order to cause a competitor VLR abort to the inbound roamer's registration attempt at a competitor VPMN. The present invention helps the VPMN operators to retain these inbound roamers on their respective networks. The present invention further allows VPMN operators to handle various cases when the inbound roamer's handset is stuck, either during its registration attempt with the competitor VPMN or after its successful registration with the competitor VPMN. This handling of stuck handset cases, allows the stuck inbound roamers to perform various MO and MT call and non-call related activities in the competitor VPMNs. The VPMN operator may also be able to authenticate the inbound roamers if HPMN requires so. The present invention allows the VPMN operator to create a fake distribution image of its competitor VPMN at an HPMN HLR that eventually results in maximizing roaming revenues for the VPMN operator.

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for redirecting roaming traffic of a roamer associated with an HPMN. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 3G | Third Generation of mobile |
| 3GPP | Third Generation Partnership Project |
| ACM | ISUP Address Completion Message |
| ANM | ISUP Answer Message |
| ATI | Any Time Interrogation |
| BCSM | Basic Call State Model |
| BSC | Base Station Controller |
| CDMA | Code Division Multiplexed Access |
| CdPA | Called Party Address |
| CgPA | Calling Party Address |
| DPC | Destination Point Code |
| DSD | Delete Subscriber Data |
| ERB | CAP Event Report Basic call state model |
| GLR | Gateway Location Register |
| GMSC | Gateway MSC |
| GSM | Global System for Mobile |
| GT | Global Title |
| HLR | Home Location Register |
| HLR-F | Forward-to number HLR |
| HLR-H | HPMN HLR |
| HLR-V | VPMN HLR |
| HPMN | Home Public Mobile Network |
| GTT | Global Title Translation |
| IAM | Initial Address Message |
| IMSI | International Mobile Subscriber Identity |
| IMSI-H | HPMN IMSI |
| ISC | International Service Carrier |
| ISD | MAP Insert Subscriber Data |
| ISTP | International STP |
| ISUP | ISDN User Part |
| ITR | Inbound Traffic Redirection |
| LU | Location Update |
| LUP | MAP Location Update |
| MAP | Mobile Application Part |
| MO | Mobile Originated |
| MSC | Mobile Switching Center |
| MSISDN | Mobile Station International Subscriber Directory Number |
| MSISDN-H | HPMN MSISDN |
| MSRN | Mobile Station Roaming Number |
| MT | Mobile Terminated |
| MTP | Message Transfer Part |
| NP | Numbering Plan |
| NPI | Numbering Plan Indicator |
| OCN | Originally Called Number |
| ODB | Operator Determined Barring |
| OTA | Over The Air |
| PRN | MAP Provide Roaming Number |
| PSL | Provide Subscriber Location |
| PSI | MAP Provide Subscriber Information |
| REL | ISUP Release Message |
| RI | Routing Indicator |
| RNA | Roaming Not Allowed |
| RR | Roaming Restricted |
| RRB | CAP Request Report Basic call state model |
| RSD | ReStore Data |
| SAI | Send Authentication Information |
| SCCP | Signal Connection Control part |
| SCP | Signaling Control Point |
| SG | Signaling Gateway |
| SIM | Subscriber Identity Module |
| SMS | Short Message Service |
| SMSC | Short Message Service Center |
| SPC | Signal Point Code |
| SRI | MAP Send Routing Information |
| SRI-LCS | MAP Send Routing Information For LoCation Service |
| SRI-SM | MAP Send Routing Information For Short Message |
| SS7 | Signaling System #7 |
| SSN | Sub System Number |
| SSP | Service Switch Point |
| STP | Signal Transfer Point |
| TCAP | Transaction Capabilities Application Part |
| TR | Traffic Redirection |
| TT | Translation Type |
| VAS | Value Added Service |
| VLR | Visited Location Register |
| VLR-V | VPMN VLR |
| VMSC | Visited Mobile Switching Center |

APPENDIX-continued

| Acronym | Description |
|---|---|
| VMSC-V | VPMN VMSC |
| VPMN | Visited Public Mobile Network |

TECHNICAL REFERENCES (EACH OF WHICH IS INCORPORATED BY THIS REFERENCE HEREIN)

"Method And System For Cellular Network Traffic redirection" application Ser. No. 10/635,804 filed on Aug. 5, 2003.

"Method and Apparatus for Defense Against Network Traffic redirection" Application No. 60/662,030 filed Mar. 14, 2005.

Q71X SCCP
Q70X MTP
Q77X TCAP
GSM 1111 SIM and Mobile Interface
GSM 1114 SIM Toolkit
IR 7320 Steering of Roaming
GSM 902 on MAP specification
Digital cellular telecommunications system (Phase 2+) Mobile Application Part (MAP) Specification (3GPP TS 09.02 version 7.9.0 Release 1998)
GSM 340 on SMS
Digital cellular telecommunications system (Phase 2+); Technical realization of the Short Message Service (SMS); (GSM 03.40 version 7.4.0 Release 1998)
GSM 348 Security and OTA,
GSM 31048 Security and OTA,
GSM 23119 Gateway Location Register,
GSM 408 Mobile Radio Interface Network Layer
GSM 23122 Mobile Station Procedure
GSM 24008 Mobile Radio Interface Network Layer
GSM22011 Service Accessibility
GSM25304 Idle Mode Selection
GSM29010 Error Network Mapping
GSM 29002 MAP Protocol

I claim:

1. A method for redirecting roaming traffic of a roamer having a handset, the roamer being associated with a Home Public Mobile Network (HPMN) and initially registered with a first Visited Public Mobile Network (VPMN), the first VPMN coupled to a redirection unit, the method comprising:
   detecting, at the first VPMN, a registration attempt of the roamer at a second VPMN, upon receipt of a first of one or more registration cancellation messages sent by the HPMN;
   sending one or more registration messages from the redirection unit to the HPMN; and
   causing, based on the one or more registration messages, the HPMN to send a registration response message to a Visited Location Register (VLR) associated with the second VPMN to thwart the registration attempt of the roamer at the second VPMN;
   wherein the redirection unit facilitates the roamer's mobile communication when the roamer's handset is stuck in the second VPMN.

2. The method of claim 1, the HPMN having an associated Home Location Register (HLR), the method further comprising:
   authenticating the roamer with the HPMN by sending one or more authentication messages, prior to sending the one or more registration messages, from the redirection unit to the HLR.

3. The method of claim 1, the HPMN having an associated Home Location Register (HLR), the method further comprising:
   in response to the registration response message, sending the one or more registration messages successively to the HPMN, thereby causing the VLR to send an abort message to the HLR.

4. The method of claim 3 further comprising:
   blacklisting the HLR and the VLR to restrict the redirection unit from sending further registration messages to the HPMN within a pre-defined time interval, upon the occurrence of one selected from a group consisting of the VLR failing to send the abort message to the HLR, and the HLR failing to send the registration response message to the VLR.

5. The method of claim 1, the HPMN having an associated Home Location Register (HLR), the method further comprising:
   blacklisting the HPMN when the HLR fails to return a Visited Mobile Switching Center (VMSC) address in response to a routing information query from the redirection unit to the HLR, wherein the blacklisting is performed to restrict the redirection unit from sending a further routing information query to the HLR.

6. The method of claim 1, the HPMN having an associated Home Location Register (HLR) and the redirection unit having an address, the method further comprising:
   sending another one of the one or more registration messages using a VMSC address and a VLR address associated with the second VPMN, from the redirection unit to the HLR, for updating the address of the redirection unit with the VMSC address and the VLR address.

7. The method of claim 6, the roamer having a profile information at the VLR and an associated Mobile Station International Subscriber Directory Number (MSISDN), the method further comprising:
   initiating a call setup request from the redirection unit to the MSISDN number of the roamer for restoring the roamer's profile information at the VLR, thus facilitating the roamer's mobile communication.

8. The method of claim 6, the roamer having a profile information at the VLR, the method further comprising:
   sending a routing information query from the redirection unit to the HLR for restoring the roamer's profile information at the VLR, thus facilitating the roamer's mobile communication.

9. The method of claim 6, the roamer having a profile information at the VLR, the method further comprising:
   sending a roaming number query from the redirection unit to the VLR for restoring the roamer's profile information at the VLR, thus facilitating the roamer's mobile communication.

10. The method of claim 1, the HPMN having an associated Home Location Register (HLR) and the redirection unit having an address at the HLR, the method further comprising:
   upon receipt of the address of the redirection unit in response to a routing information query sent from the redirection unit to the HLR, sending a registration location detached message to the HLR to remove the address of the redirection unit from the HLR, when thwarting the registration attempt of the roamer at the second VPMN fails.

11. A system for redirecting roaming traffic of a roamer having a handset, the roamer being associated with a Home Public Mobile Network (HPMN) and initially registered with a first Visited Public Mobile Network (VPMN), the system comprising:
- a detection unit coupled to a first VPMN for detecting a registration attempt of the roamer at a second VPMN, upon receipt of a first of one or more registration cancellation messages sent by the HPMN; and
- a redirection unit coupled to the first VPMN for sending one or more registration messages to the HPMN to cause the HPMN to send a registration response message to a Visited Location Register (VLR) associated with the second VPMN for thwarting the registration attempt of the roamer at the second VPMN;
- wherein the redirection unit facilitates the roamer's mobile communication when the roamer's handset is stuck in the second VPMN.

12. The system of claim 11, the HPMN having an associated Home Location Register (HLR), the system further comprising:
- at the redirection unit, means for sending the one or more registration messages successively to the HPMN for causing the VLR to send an abort message to the HLR in response to the registration response message.

13. The system of claim 12, further comprising:
- means for blacklisting the HLR and the VLR to restrict the redirection unit from sending further registration messages to the HPMN within a pre-defined time interval, upon the occurrence of one selected from a group consisting of the VLR failing to send the abort message to the HLR, and the HLR failing to send the registration response message to the VLR.

14. The system of claim 11, the HPMN having an associated Home Location Register (HLR), the system further comprising:
- means for blacklisting the HPMN when the HLR fails to return a Visited Mobile Switching Center (VMSC) address in response to a routing information query from the redirection unit to the HLR, wherein the blacklisting is performed to restrict the redirection unit from sending a further routing information query to the HLR.

15. The system of claim 11, the HPMN having an associated Home Location Register (HLR) and the redirection unit having an address, the system further comprising:
- means for sending another one of the one or more registration messages using a VMSC address and a VLR address associated with the second VPMN, from the redirection unit to the HLR, for updating the address of the redirection unit with the VMSC address and the VLR address.

16. The system of claim 11, the HPMN having an associated Home Location Register (HLR) and the redirection unit having an address at the HLR, the system further comprising:
- means for sending a registration location detached message to the HLR to remove the address of the redirection unit from the HLR, upon receipt of the address of the redirection unit in response to a routing information query sent from the redirection unit to the HLR, when thwarting the registration attempt of the roamer at the second VPMN fails.

17. A computer program product comprising a computer usable non-transitory medium having a computer usable program code stored thereon for redirecting roaming traffic of a roamer having a handset, the roamer being associated with a Home Public Mobile Network (HPMN) and initially registered with a first Visited Public Mobile Network (VPMN), the first VPMN coupled to a redirection unit, the computer program product comprising:
- first computer usable program code means for detecting, at the first VPMN, a registration attempt of the roamer at a second VPMN, upon receipt of a first of one or more registration cancellation messages sent by the HPMN;
- second computer usable program code means for sending one or more registration messages from the redirection unit to the HPMN; and
- third computer usable program code means for causing, based on the one or more registration messages, the HPMN to send a registration response message to a Visited Location Register (VLR) associated with the second VPMN to thwart the registration attempt of the roamer at the second VPMN;
- wherein the redirection unit facilitates the roamer's mobile communication when the roamer's handset is stuck in the second VPMN.

18. The computer program product of claim 17, the HPMN having an associated Home Location Register (HLR), the computer program product further comprising:
- fourth computer usable program code means for authenticating the roamer with the HPMN by sending one or more authentication messages, prior to sending the one or more registration messages, from the redirection unit to the HLR.

19. The computer program product of claim 17, the HPMN having an associated Home Location Register (HLR), the computer program product further comprising:
- fifth computer usable program code means for sending, in response to the registration response message, the one or more registration messages successively to the HPMN, thereby causing the VLR to send an abort message to the HLR.

20. The computer program product of claim 19 further comprising:
- fifth computer usable program code means for blacklisting the HLR and the VLR to restrict the redirection unit from sending further registration messages to the HPMN within a pre-defined time interval, upon the occurrence of one selected from a group consisting of the VLR failing to send the abort message to the HLR, and the HLR failing to send the registration response message to the VLR.

* * * * *